(12) United States Patent
Maron et al.

(10) Patent No.: US 12,190,639 B1
(45) Date of Patent: Jan. 7, 2025

(54) USING SENSOR DATA TO DETERMINE ACTIVITY

(71) Applicant: Amazon Technologies, Inc., Seattle, WA (US)

(72) Inventors: Oded Maron, Sudbury, MA (US); Jeremy S De Bonet, Southborough, MA (US); Mirko Ristivojevic, Cambridge, MA (US); Ejaz Ahmed, Needham, MA (US); Kilho Son, Brookline, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/504,814

(22) Filed: Nov. 8, 2023

Related U.S. Application Data

(63) Continuation of application No. 17/867,171, filed on Jul. 18, 2022, now Pat. No. 11,847,860, which is a continuation of application No. 16/572,263, filed on Sep. 16, 2019, now Pat. No. 11,393,253.

(51) Int. Cl.
| | |
|---|---|
| *G06V 40/20* | (2022.01) |
| *G06F 18/24* | (2023.01) |
| *G06Q 30/0601* | (2023.01) |
| *G06T 7/246* | (2017.01) |
| *G06T 7/73* | (2017.01) |

(Continued)

(52) U.S. Cl.
CPC .............. *G06V 40/20* (2022.01); *G06F 18/24* (2023.01); *G06Q 30/0601* (2013.01); *G06T 7/248* (2017.01); *G06T 7/74* (2017.01); *G06V 10/25* (2022.01); *H04N 23/54* (2023.01); *G06T 2207/30196* (2013.01); *G06T 2207/30241* (2013.01)

(58) Field of Classification Search
CPC ............. G06K 9/00335; G06K 9/3233; G06K 9/6267; G06T 7/74; G06T 7/248; G06T 2207/30196; G06T 2207/30241; G06Q 30/0601; H04N 5/2253
See application file for complete search history.

(56) References Cited

U.S. PATENT DOCUMENTS

| | | |
|---|---|---|
| 9,117,106 B2 | 8/2015 | Dedeoglu et al. |
| 9,235,928 B2 | 1/2016 | Medioni et al. |
| 9,473,747 B2 | 10/2016 | Kobres et al. |

(Continued)

OTHER PUBLICATIONS

Office Action for U.S. Appl. No. 16/572,263, mailed on Aug. 10, 2021, Maron, "Using Sensor Data to Determine Activity" 36 pages.

(Continued)

*Primary Examiner* — Pinalben Patel
(74) *Attorney, Agent, or Firm* — Lee & Hayes, P.C.

(57) ABSTRACT

This disclosure is directed to, in part, a processing pipeline for detecting predefined activity using image data, identifying an item-of-interest and a location of the item-of-interest across frames of the image data, determining a trajectory of the item-of-interest, and determining an identifier of the item-of-interest and an action taken with respect to the item-of-interest. The processing pipeline may utilize one or more trained classifiers and, in some instances, additional data to identify items that are placed into or removed from a tote (e.g., basket, cart, or other receptacle) by users in material handling facilities as the users move around the material handling facilities.

20 Claims, 8 Drawing Sheets

(51) Int. Cl.
*G06V 10/25* (2022.01)
*H04N 23/54* (2023.01)

(56) References Cited

U.S. PATENT DOCUMENTS

| | | |
|---|---|---|
| 9,811,818 B1 | 11/2017 | Xing |
| 10,032,285 B1 | 7/2018 | Ma |
| 11,151,383 B2 | 10/2021 | Guttmann et al. |
| 11,176,686 B2 | 11/2021 | Mirza et al. |
| 11,393,253 B1 * | 7/2022 | Maron .................. G06V 20/52 |
| 2005/0144091 A1 * | 6/2005 | Harper ............... G06Q 30/0601 |
| | | 705/27.1 |
| 2006/0095346 A1 | 5/2006 | Gambhir |
| 2006/0147087 A1 | 7/2006 | Goncalves et al. |
| 2009/0262981 A1 * | 10/2009 | Ike .......................... G06T 7/248 |
| | | 382/209 |
| 2011/0135148 A1 | 6/2011 | Hsiao et al. |
| 2013/0284806 A1 | 10/2013 | Margalit |
| 2016/0109281 A1 * | 4/2016 | Herring ................ G06Q 20/209 |
| | | 177/1 |
| 2017/0278255 A1 | 9/2017 | Shingu et al. |
| 2018/0350144 A1 | 12/2018 | Rathod |
| 2019/0156273 A1 | 5/2019 | Fisher et al. |
| 2019/0228457 A1 | 7/2019 | Wu |
| 2021/0124926 A1 | 4/2021 | Krishnamurthy et al. |
| 2024/0221216 A1 * | 7/2024 | Powers .................. G06V 20/20 |

OTHER PUBLICATIONS

Office Action for U.S. Appl. No. 17/867,171, mailed on Apr. 26, 2023, Oded Maron, "Using Sensor Data to Determine Activity", 13 pages.

* cited by examiner

USING SENSOR DATA TO DETERMINE ACTIVITY

RELATED APPLICATIONS

This application claims priority to and is a continuation of U.S. patent application Ser. No. 17/867,171, filed on Jul. 18, 2022, which claims priority to and is a continuation of U.S. patent application Ser. No. 16/572,263, filed on Sep. 16, 2019, the entire contents of which are incorporated herein by reference.

BACKGROUND

Materials handling facilities, such as warehouses or retail stores, often provide users with totes (e.g., carts, baskets, etc.) to facilitate the processes by which the users locate, identify, retrieve, and transport items at the facilities. For example, when a user identifies an item that he or she desires on a shelf or other location within a materials handling facility, the user may remove the item from the shelf or other location and place the item into a receptacle of a tote before the user continues to travel through the facility in search of additional items.

Traditionally, when the user has finished identifying and retrieving the items he or she desires, the user may transport the items in the tote to a check-out destination within the materials handling facility, such as a distribution station, a cashier, or a dedicated self-checkout stand, and transition the items to a human operator or an automated agent. Typically, the user or the human operator manually removes the items from the tote, scans or otherwise registers the items with the user, and places the items into one or more bags or other item carriers. The user may then use the bags or other item carriers to transport the items to another destination (e.g., to an automobile, workstation, or home) by manually carrying the item carriers to the other destination, or by transporting the item carriers to the destination within the tote. Therefore, traditional methods for acquiring items some materials handling facilities often require users to load items into their totes, remove the items from the tote for payment, and return the items to the totes and/or other item carriers for transporting the items to another location, such as the users' automobiles or homes.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
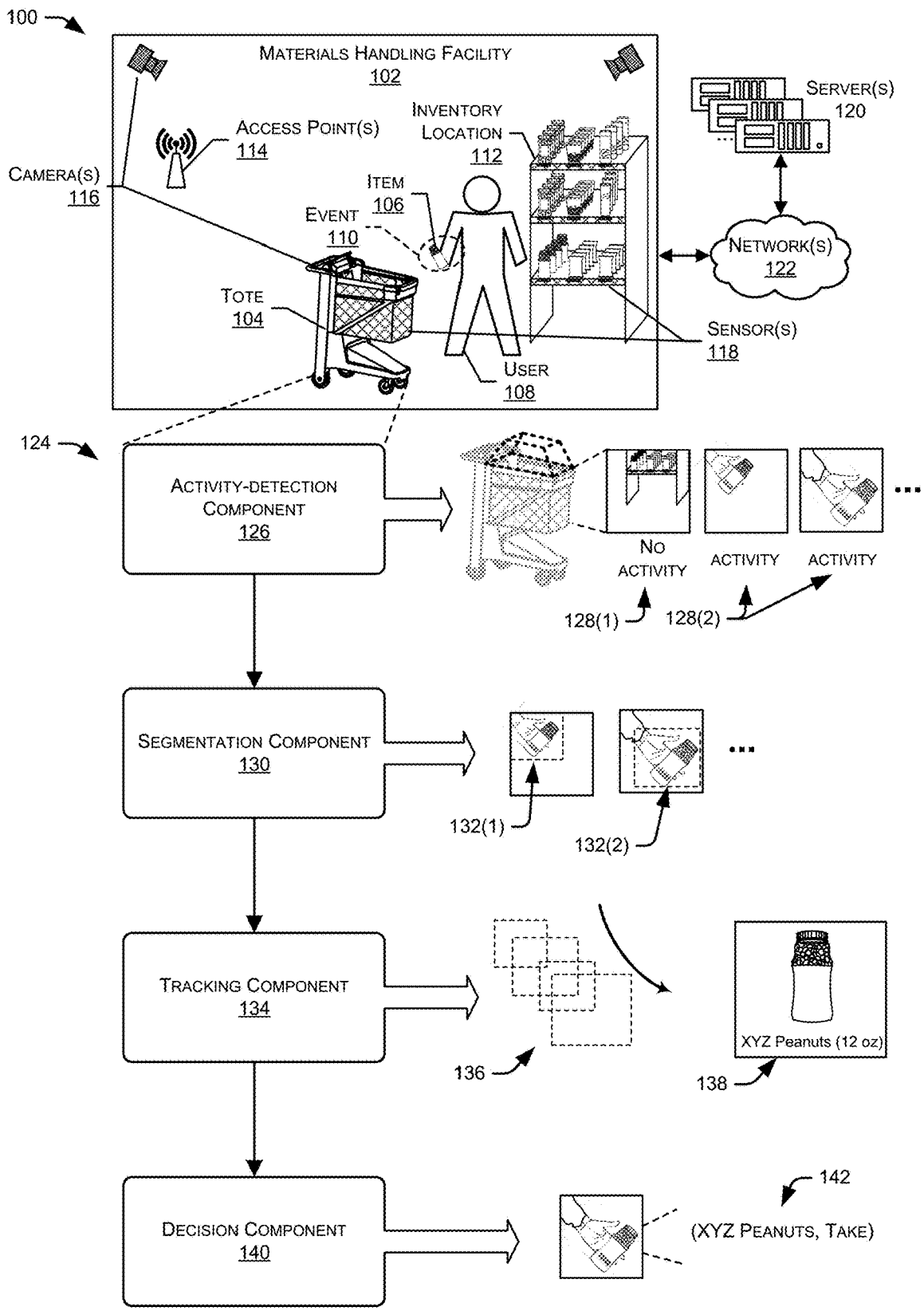
FIG. 1 illustrates an example environment of a materials handling facility that includes an item-identifying tote to generate image data and, using the image data, identify items placed into, and removed from, the tote. In order to efficiently use computing and power resources of the tote, the tote identifies these events using a multi-stage processing pipeline that includes an activity-detection component that determines whether image data represents activity of interest, a segmentation component that identifies regions-of-interest in image-data frames, a trajectory component that determines a trajectory of these regions-of-interest over multiple frames, and a decision component that receives the trajectory data and other data for determining an identity of an item and an action taken with respect to the item. For example, the decision component may determine that a particular item was placed into the cart or that a particular item was removed from the cart.

This disclosure is directed to, in part, a processing pipeline for detecting predefined activity using image data, identifying respective regions-of-interest that represent a common item across frames of the image data, determining a trajectory of the item based on the regions-of-interest, and determining an identifier of the common item and an action taken with respect to the common item. The processing pipeline may utilize one or more trained classifiers and, in some instances, additional data to identify items that are placed into or removed from a tote (e.g., basket, cart, or other receptacle) by users in material handling facilities as the users move around the material handling facilities.

Traditionally, facilities that offer items (or products) for acquisition by users may provide users with traditional shopping carts that have a durable frame, including or supporting a basket, multiple wheel castors configured to allow the cart to move on a surface, and handle for users to push the tote around in a facility. These facilities often offer other types of totes, such as hand baskets to store items as the user moves around the store. While these totes are useful for storing items on behalf of users during their shopping session, they result in additional effort for the users during a traditional checkout experience. For example, users must first retrieve items from shelves or other storage locations and place the items into the tote, and second, the users must remove the items from the tote, have the items scanned, and then placed back into a bag or other item carrier. These intervening actions that are required to transition items from a shelf or other storage location into the bags or other item carrier necessarily slows the process by which items are retrieved from a materials handling facility and tend to mitigate the advantages that totes provide.

The techniques described herein generally include the use of item-identifying totes that may be utilized by users in material handling facilities to automatically identify items that the users place in their totes as they move around the material handling facilities. Upon identifying items and actions taken with respect to the items (e.g., placing the item in the tote, removing the item from the tote, etc.), the item-identifying totes may update virtual item listings for the users to represent the items that have been placed in, or removed from the physical totes. According to the techniques described herein, an item-identifying tote (or "smart tote") may include one or more cameras coupled to the tote to generate image data representing items that a user places in the tote, and/or removes from the tote. The tote may include one or more components (e.g., software component(s), hardware processor(s), etc.) that analyze the image data to determine an item identifier for the item(s) placed in the tote, or removed from the tote, and update a virtual item listing for the user of the tote. Once a user has finished their shopping session, the user may be able to efficiently check-out of the facility without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual item listing of the user that were identified by the tote during the user's shopping session.

In some instances, a tote described herein may include one or more cameras configured to acquire image data of an item being placed into, or removed from the tote. In other instances, a facility may include one or more overhead cameras, one or more in-shelf cameras, and/or one or more other cameras configured to acquire the image data of the item. Regardless of the origin of the image data, the techniques described herein may The techniques described herein may begin by using one or more cameras mounted to a tote to generate image data, which may represent items being placed into or removed from the tote. The techniques may determine whether the image data represents a predefined activity, such as a user placing an item into or removing an item from the tote, by generating feature data of the image data and inputting the feature data into an activity classifier. The activity classifier may have been trained to identify the predefined activity. For example, the activity classifier may have been trained, using supervised learning, by inputting, into the classifier, positive examples of the predefined activity. For example, feature data associated with image data representing users putting items into and removing items from totes, along with labels indicating that the image data represents the predefined activity, may have been input to the activity classifier during training. In addition, the activity classifier may have also been trained using negative examples. For example, feature data generated from image data that does not represent the predefined activity, along with respective labels indicating that the image data does not represent the predefined activity, may have been input into the activity classifier during training.

After training, the feature data from the current image data may be input into the activity classifier, which may output an indication of whether the current image data represents the predefined activity. In some instances, the tote may include multiple cameras, and feature data generated from image data from each of these multiple cameras may be combined and input into the activity classifier together. If the activity classifier does not output an indication of the predefined activity, the techniques may continue to input feature data from subsequent image data into the activity classifier to attempt to identify the predefined classifier. Upon the activity classifier outputting an indication of the predefined activity, the techniques may begin analyzing subsequent frames of the image data to identify one or more items-of-interest and respective locations of the items-of-interest, as described below. In some instances, the tote may include one or more cameras positioned on first side of the tote directed toward a second side, and one or more cameras on the second side of the tote directed toward the first side. For example, the tote may include four corners, with a respective camera being positioned on each corner such that the cameras face one another. Given that the activity classifier may have been trained using feature data derived from image data from each of these four cameras (for example), the activity classifier may be configured to identify predefined activity that occurs at a location visible by each of the cameras (e.g., within airspace above the tote), while refraining from outputting an indication of predefined activity that is viewable by some but not all of the cameras. The activity classifier is thus trained to identify activity within the tote, but not activity external to the tote Upon the activity classifier outputting an indication of the predefined activity (e.g., occurring within the view of each camera), the techniques may perform a segmentation process one or more subsequent image frames for identifying regions-of-interest of the frames, which may represent items-of-interest of the respective locations of these items. The segmentation process may, thus, both classify each image frame as including a region-of-interest (or not), with each region-of-interest being associated with location data indicating a location of the image data that may include an item-of-interest within the frame. In order to do so, the segmentation process may include inputting feature data of each image frame into another trained classifier for identifying region-of-interest. This trained item classifier may have been trained using both positive and negative examples of items within the training image data. For example, the positive examples may depict items offered for acquisition (e.g., cereal boxes, produce, boxes, etc.), while the negative example may depict non-item image data (e.g., image data representing a background of a store, etc.). In addition, the segmentation component may, upon receiving an indication from the item classifier that a frame of image data represents an item-of-interest, determine a location of the item within the image data. For example, the segmentation component may generate coordinates of a bounding box (or other polygon) of the frame of mage data representing the location of the item-of-interest within the frame of image data. Further, in some instances the segmentation component may identify multiple items-of-interest in a single frame and, thus, may generate location data indicating a bounding box associated with each of the items-of-interest in the respective frame. Of course, while several examples are provided, it is to be appreciated that the techniques may identify and indicate the regions-of-interest in other ways.

In order to identify the regions-of-interest, the segmentation component may use pixel-wise dense motion vectors computed on adjacent image-data frames to identify areas of movement within an airspace of the tote. These areas of movement may then be analyzed to identify the regions-of-interest. Further, in order to remove noise from the motion vectors, the segmentation component may subject the motion vectors to one or more image-processing filters, such as a low-pass filter, a multi-level-pyramid-blurring filter, and an adaptive-threshold filter to separate motion vectors generated by items-of-interest from those generated by other objects in the image data (e.g., noise, shadows, etc.). The output of the adaptive-threshold filter may comprise a binary mask, which the segmentation component may analyze to identify potentially unique items-of-interest in the image frames. The segmentation component may then output data indicative of these regions-of-interest to a trajectory component of the pipeline.

In some examples, the regions-of-interest may comprise location data, which may be sent to a tracking component configured to generate trajectory data indicating a trajectory of each region-of-interest. That is, given that respective regions-of-interest may represent a common item over time, the trajectory component may generate trajectory data indicating a trajectory of the common item over time. For example, for each region-of-interest identified in a first frame of the image data, the tracking component may attempt to match an item represented in the region-of-interest to an item identified in other regions-of-interest in nearby frames (e.g., using a maximum-weight bipartite matcher). For example, if the segmentation component identified a single region-of-interest in a first frame, the tracking component may compare visual characteristics of items represented by the region-of-interest in the subject frame to visual characteristics of other items identified in other respective regions-of-interest nearby frames. If the segmentation identifies multiple regions-of-interest in a single frame, the tracking component may compare visual characteristics of each of these regions-of-interest to each of respective other regions-of-interest in other frames.

Upon identifying a common item represented by regions-of-interest across multiple frames, the tracking component may use the location data associated with each frame representing the item-of-interest to generate trajectory data indicating a trajectory of the item over time. For example, the trajectory component may generate the trajectory data using the location of each bounding box over the frames in which the item has been identified (e.g., the region-of-interest). The trajectory data may thus represent the trajectory of the item, such as a trajectory towards the tote (in cases of a user placing an item into the tote), a trajectory away from the tote (in cases of the user removing the item from the tote), a trajectory towards the tote and then away from a tote (in cases of the user placing the item into the tote before removing the item from the tote), and so forth.

In addition, during, before, and/or after the tracking component generates the trajectory data for each item, an item-identification component may attempt to determine an item identifier associated with each item represented by one or more regions-of-interest. For example, the item-identification component may use the image data and/or other data (e.g., weight data, etc.) to identify the item that was placed into or removed from the tote. In one example, the item-identification component analyzes one or more frames of the image data depicting the item-of-interest to identify a barcode or other identifier of the item and may use the barcode to determine the item identifier of the item. In other instances, the item-identification component may use other visual indicia of the item interest (e.g., shape, color, etc.) to identify the item. For example, the item-identification component may input feature data associated with the image data into each of multiple classifiers configured to identify a respective item in order to identify the item.

After the tracking component generates the trajectory data and/or the item-identification component identifies the item, some or all of this data may be provided to a decision component for making a determination regarding the identity of the item represented by the regions-of-interest and an action taken with respect to the item. In instances where the decision component receives an item identifier from the item-identification component, the decision component may use this item identifier as the identity of the item. Further, the decision component may use the trajectory data to determine the action taken with respect to the identified item. For example, if the trajectory data indicates a trajectory of the item into the tote, the decision component may determine that a take of the item occurred and may output data indicative of a "take" of the identified item. In some instances, this information may be used to add the item identifier to a virtual cart associated with the user operating the tote. That is, a virtual listing of items acquired by the user may be updated to indicate addition of the item identifier. In another example, the decision component may determine, based on the trajectory data indicating the item moving out of the cart, that a "return" has been performed. Thus, this information may be used to update the virtual cart of the user to indicate removal of the item from the tote of the user. In still other instances, the decision component may indicate that the action is "unknown".

In some instances, the decision component comprises yet another trained classifier(s) (e.g., a support-vector machine (SVM)) that has been trained to determine action performed with respect to items based on labeled trajectory data, potentially along with a confidence score indicating a degree of confidence of the result. For example, a decision classifier may have been trained with positive examples of item takes, negative examples of item takes, positive examples of item returns, negative examples of item returns, and/or the like. Further, the decision component may make the determination of these actions with reference to the trajectory data, weight data acquired by one or more weight sensors of the tote, and/or additional sensor data.

To utilize a smart tote as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or totes, can recognize the user. For instance, the user may have registered to identify themselves to the tote using any identification technique, such as presenting an identification means to a camera/scanner (e.g., presenting a driver's license, presenting a facility-issued card, presenting a user identifier via a mobile phone, etc.), speaking a predefined utterance (e.g., a name of the user, a predefined keyword, etc.), and/or looking into a camera for facial recognition. Once a user has identified themselves to a smart tote or another device in the facility, the user may begin a shopping session where the smart tote identifies and tracks items retrieved by the user and placed in the smart tote.

After the user has moved throughout the materials handling facility and selected the items they desire to purchase or otherwise take from the facility, the user may end the shopping session in various ways. For instance, the user may return a tote to a tote corral or other storage location, provide input to the tote indicating an end of the shopping session (e.g., utterance, utilize a user interface element on a touch display, etc.), or simply remove bags or other item carriers from the tote and leave the facility. After the user has ended their shopping session, the list of item identifiers in the virtual item listing may be uploaded to one or more remote servers that manage user accounts for users of the facility. The servers may charge the appropriate user account for the listing of the items in the virtual item listing that the user took from the facility.

Although some of the techniques described below are performed locally on the tote, in other examples, some or all of the techniques may be performed by one or more backend devices or servers associated with the facility. For instance, the sensor data and/or image data may be collected at the tote and sent over network(s) to backend devices at the facility, or server devices located remote from the facility, to be processed remotely. However, in some instances it may be advantageous for at least some of the processing to be performed on the tote to reduce latency in identifying items placed in the tote. For instance, it may be advantageous to have low latency when requesting that a user provide feedback to help identify an item recently placed in the tote, rather than the user continuing their shopping session and being asked later about an item. Further, while various techniques described below are with reference to purchasing items in a retail facility, the techniques are generally applicable to any materials handling facility in which a user may place items in a tote. For example, although the techniques described herein are primarily with reference to identifying items placed in a tote by a user for the purpose of identifying a user account to charge for items selected from a materials handling facility, the techniques are equally applicable to any industry in which user recognition may be helpful. For instance, the idem-identifying tote may be implemented for distribution centers where employees collect items from various locations to be shipped through the mail system.

In some instances, the techniques may be performed with traditional totes (e.g., carts or baskets) that do not include any sensors or electronics at all. For instance, the facilities themselves may include sensors such as weight sensors, cameras, etc., that send sensor data and image data to backend devices to perform the techniques described herein. The backend devices may analyze the sensor data and/or image data using the multi-stage processing pipeline as described herein and maintain a virtual item listing for the users in the facility.

Although the techniques described herein are with reference to a session of a user in a materials handling facility, the techniques are generally applicable to any item-recognition environment. Other examples may include inventory-management systems automating the intake of new shipments of item inventory, libraries for processing returned books and/or identifying books obtained by a user during a library session, video-rental facilities for processing and sorting returned movies, and so forth.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility 102 that includes an item-identifying tote 104 to identify items 106 placed in, and removed from, the tote 104 by a user 108. The tote 104 uses one or more trained classifiers, operating on image data, potentially in addition to other information associated with the shopping session to determine an item identifier and update a virtual item listing (or "virtual cart") using the item identifier. The tote uses one or more cameras and/or sensors to detect an item 106, generate image data depicting the item 106, analyzes the image data and additional data to determine an item identifier for the item 106, determine an event 110 involving the item (e.g., add to tote, remove from tote, multiple items, quantity of items, etc.) and update a virtual item listing using the item identifier.

As FIG. 1 depicts, the user 108 may have engaged in a shopping session in the materials handling facility 102. For instance, the user 108 may have selected an item 106 from an inventory location 112 (e.g., shelf, aisle, etc.) and placed the item 106 in the tote 104 (e.g., shopping tote). The inventory location 112 may house one or more different types of items 106 and the user 108 may pick (i.e., take, retrieve, etc.) one of these items 106.

Upon entering a facility 102, a user 108 may desire to utilize a tote 104 for their shopping session to transport items 106 around the facility 102 during their shopping session. In such examples, the user 108 may approach a cart corral, basket stack, or other tote storage location at which totes 104 are stored. In some examples, a tote corral may comprise a structure, such as an aisle, for storing nested totes. Generally, two or more of the totes may be configured to nest or otherwise functionality join with one another, so that the totes may be easily stored in a tote corral, and/or transported in bulk. In some examples, the tote corral may provide additional functionality beyond storage. For instance, the tote corral may facilitate charging of the nested totes that are in the tote corral. For instance, the tote corral may have various electrical contacts extending along the length of a horizontal and/or vertical member of the corral that, when placed in electrical contact with an electrical contact of the nested totes, charge one or more batteries of the nested totes. In other examples, power cords may extend from the tote corral that may be plugged into the nested totes to recharge batteries of the nested totes while not in use.

To utilize a tote 104, a user 108 may approach an unused tote that is not currently engaged in a shopping session (e.g., a stored tote), and interact with the unused tote 104 to identify themselves to the tote 104 and begin a shopping session. For instance, the totes 104 may include sensors, such as a barcode sensor (e.g., an image sensor such as a camera, photodetector, or other sensing apparatus designed to read a one or two-dimensional barcode) such that when a user 108 presents a user device, or portion thereof, such as the display, to the barcode sensor, the tote 104 may identify the user and corresponding user account for a shopping session. Other types of interaction may be performed by a user 108 to identify themselves to a tote 104 (e.g., uttering a name or other keyword to identify the user 108, presenting the user's face for facial recognition, typing in a password or other user information into a display of the tote 104, and/or any other type of user identification technique).

Once a user has identified themselves to the tote 104, the item-identifying functionality of the tote 104 may be activated such that subsequent items 106 placed in the tote 104 will be identified by the tote 104 and added to a virtual item listing for the user 108. In some instances, however, the tote 104 and/or additional systems in communication with the tote 104 may be configured to identify the items placed into, or removed from, the tote 104 without the need for the user 108 to specifically scan the respective items or otherwise perform any actions other than simply place the items into, or remove the items from, the tote. Stated otherwise, the tote 104 and/or the systems may be configured to identify the items in response to the user interacting with the items in the same manner as if the tote 104 include sensors or no item-identification logic.

As illustrated, a user 108 may move the tote 104 around the facility 102 to one or more inventory locations 112. The user 108 may retrieve items from the inventory location 112 and place the items 106 in the tote 104. Additionally, the use 104 may retrieve items 106 from the tote 104 and put the items 106 back in an inventory location 112, such as when the user 108 changes their mind regarding their desire to purchase or otherwise acquire the item 106. The tote 104 may include various components for identifying item identifiers corresponding to the items 106 placed in the tote, determining respective actions taken with respect to these items, and maintaining a virtual item listing for the shopping session of the user 108.

In some instances, the facility 102 may include various sensors configured to interact with the tote 104 and/or generate sensor data in addition to, or as an alternative to, the sensor data generated by the tote 104. For instance, the facility 102 may include one or more access points 114 configured to emit signals (e.g. WiFi, Bluetooth Beacons, etc.) that are detected by the tote 104 for use in determining the location of the tote 104 in the facility 102. Further, the facility 102 may include one or more camera(s) 116, mounted to the tote or otherwise, configured to generate image data that depicts the facility 102, such as the events 110 occurring in the facility, items 106 involved in the events, and/or users 108 that selected the items 106. Further, the facility 102 may include one or more weight sensors 118 (e.g., mounted to the tote 104, disposed in the inventory locations 112, etc.) to detect generate sensor data indicative of the removal of, or return of, items 106 from the inventory locations 112. The facility 102 may include one or more backend devices or servers, and/or may transmit the data to the servers 120 at a remote location, for analysis using the techniques described herein. That is, the techniques described herein may be performed entirely by the tote 104 using sensor data and image data generated by sensors of the tote, entirely by backend devices/servers of the facility 102 (or remote servers) using sensor data and image data generated by the tote, entirely by backend devices/servers of the facility 102 (or remote servers) using sensor data and image data generated by sensors in the facility, and/or any combination thereof.

FIG. 1 illustrates a multi-stage processing pipeline 124 that the tote 104 and/or another system(s) may utilize for identifying items and actions taken with respect to the identified items. For example, the pipeline 124 may comprise one or more components configured to output an identifier of an item (e.g., a name of the item, an alphanumeric string, a universal product code (UPC), etc.) and an action taken with respect to the identified item (e.g., a take of an item, a return of an item, etc.). In some instances, the pipeline 124 may also output confidence-level data indicating a confidence level associated with the determined result (e.g., item/action pair).

As illustrated, the pipeline 124 may include an activity-detection component 126 configured to analyze image data to determine whether the image data represents predefined activity. In some instances, the activity-detection component 126 comprises a convolutional neural network (CNN) or other trained classifier that has been trained, via supervised learning, to determine whether input image data represents predefined activity. In some instances, the activity-detection component 126 represents a CNN that has been trained by inputting feature data generated from image data that represents users placing items into respective totes (positive samples), as well as by inputting feature data generated from image data that represents other activity, such as users simply pushing the tote through the facility 102.

In some instances, the activity-detection component 126 operates on image data generated by multiple cameras mounted to the tote 104. For example, the tote 104 may include four cameras, each mounted to one of four respective corners of a basket-portion of the tote 104 and each facing inwards towards the basket-portion. In these examples, image data from each of the cameras may be combined for purposes of training the CNN as well as for purposes of inputting data into the CNN for receiving output label data. That is, when training the CNN, feature data may be generated from after combining image data from each image data generated by the respective four cameras. Similarly, feature data may be generated from the combination of image data generated from each of the four cameras prior to being input into the trained CNN. By combining the image data in this manner, the CNN (or other type of activity classifier) may be configured to differentiate from activity that occurs within the airspace of the basket-portion of the tote 104 (and, thus, in the purview of each camera) and activity that occurs outside the basket-portion of the tote 104 (and, thus, outside the purview of each camera).

As illustrated, the activity-detection component 126 may generate feature data from the image data, input the feature data into the CNN or other type of classifier, and output one of a first label 128(1) indicating that the image data does not represent the predefined activity or a second label 128(2) indicating that the image data does represent the predefined activity. In the illustrated example, the activity-detection component 126 indicates that a first frame does not represent the predefined activity and, thus, is associated with the label 128(1), while the latter two illustrated frames (each showing a user holding an item) does represent the predefined activity and, thus, are associated with the second label 128(2).

Upon identifying the predefined activity, the pipeline 124 may begin passing the generated image data to a segmentation component 130 configured to identify region(s)-of-interest in frames of the image data. These regions-of-interest may comprise those portion(s) of the image data that may represent an item-of-interest (e.g., a product, a hand, etc.) and, thus, may comprise location data indicating a portion of a respective image frame. Meanwhile, if the activity-detection component 126 does not identify the predefined activity, then the pipeline 124 may refrain from passing the data to the segmentation component 130. By doing so, it is to be appreciated that the pipeline 124 limits the computational expense of performing portions of the pipeline 124 subsequent the activity-detection component 126, thus saving computational resources of the tote 104.

The segmentation component 130 may receive the image data indicated as representing the predefined activity and, potentially, a number of frames after the frame at which the predefined activity was identified and may attempt to identify any regions-of-interest in these frames, as well as their respective locations. To do so, the segmentation component 130 may comprise a classifier that has been trained using supervised learning to identify existence of an item within an image. For example, this classifier may have been trained using positive examples of images of users holding different types of items as the users are adding or removing the respective items from the respective totes. Further, this classifier may have been trained using negative examples: that is, images where users are not holding such items. Further, the positive training data may indicate the location (e.g., bounding-box coordinates) of the regions represented in the positive examples, thus training the classifier to identify frames that depict region(s)-of-interest, as well as to identify locations of these regions.

In the illustrated example, the segmentation component (e.g., via a segmentation classifier) identifies a first bounding box 132(1) corresponding to a first region-of-interest in a first frame and a second bounding box 132(2) corresponding to a second region-of-interest in a second frame. While two example frames are illustrated, it is to be appreciated that the segmentation component 130 may attempt to identify region(s)-of-interest across any number of frames. Further, while this figure illustrates a single item-of-interest and bounding box in the example frames, it is to be appreciated that in some instances the segmentation component 130 may identify multiple regions-of-interest (e.g., via corresponding bounding boxes) in a single frame.

In addition to identifying region(s)-of-interest and their locations (e.g., using the trained segmentation classifier/localizer), the segmentation component 130 may attempt to correlate regions-of-interest across image-data frames. For example, upon identifying the region-of-interest corresponding to the first bounding box 132(1), the segmentation component 130 may compare visual characteristics of this portion of the frame to visual characteristics of previously identified regions-of-interest to determine whether the regions-of-interest represent a common item. For example, the segmentation component may compute a similarity between regions of interest in order to determine whether the regions-of-interest represent a common item. If the similarity is greater than a threshold, then the region-of-interest corresponding to the bounding box 132(1) may be associated with that previously identified region-of-interest. If, however, the item-of-interest in the first bounding box 132(1) is not determined to correspond to a previously identified region-of-interest (e.g., because no comparison resulted in a similarity that is greater than the threshold), then the segmentation may generate a new identifier for that region-of-interest.

Further, upon identifying another region-of-interest, such as the region-of-corresponding to the second bounding box 132(2), the segmentation component 130 may compare visual characteristics of this portion of the image data to visual characteristics of previously identified region-of-interest to determine whether they represent a common item. In this example, the segmentation component 130 may identify that the item represented in the bounding box 132(1) corresponds to the item represented in the region-of-interest corresponding to the bounding box 132(1) and, thus, may associate the former region-of-interest with the identifier previously created for the latter region-of-interest. By identifying region(s)-of-interest that correspond to one another across frames, the segmentation component 130 may, thus, generate location data indicating the different locations of each item over time within the respective image data. That is, this location data may specify a portion of the generated image data, such as X-Y coordinate data or other location data indicating a portion (e.g., a bounding box) of the image data corresponding to the region-of-interest. This location data may then be provided to a tracking component 134.

The tracking component 134 may receive the location data associated with each identified region-of-interest and may generate, using the location data, trajectory data for each common item represented by one or more regions-of-interest. For example, the tracking component 134 may using the coordinates of the bounding box to determine a trajectory 136 of the item represented by the regions-of-interest over time (i.e., over the frames of the image data). In one example, the tracking component may determine a center point of each bounding box and may fit a line or curve to each center point associated with each bounding box of a region-of-interest corresponding to a common item, with this line or curve representing the trajectory 136. Of course, while one example is provided, it is to be appreciated that the trajectory 136 may be provided in multiple other manners.

In addition, in some instances another component, such as an item-identification component 138, may attempt to determine an item identifier 138 associated with each common item represented by one or more regions-of-interest while, before, or after the tracking component 134 generates the trajectory data. For example, during processing of the image data via the pipeline 124, a parallel item-identification process may occur to identify each item represented in a region-of-interest. This may include identifying each item using a barcode represented by the image data, using trained image classifiers to identify respective items from image data, using weight data to identify items placed into the tote, and/or the like.

The tracking component 134, meanwhile, may provide the trajectory data to a decision component 140. For example, after an item does not appear in a region-of-interest for a certain number of frames (e.g., three frames, ten frames, etc.), the tracking component 134 may "close out" the item and provide the trajectory data to the decision component 134. Stated otherwise, once an item appears to disappear from the view of the camera for a certain amount of time, the tracking component 134 may cease attempting to locate that item from subsequent regions-of-interest in subsequent image-data frames and may provide the trajectory data for that item to the decision component 140 for attempting to determine the identity of the item and/or an action taken with respect to the item.

In instances where an item-identification component has determined an item identifier 138 of the item, that information may also be passed to the decision component for determining output data. In addition, or in the alternative, other information, such as weight data or the like, may be provided to the decision component 140.

In some instances, the decision component comprises one or more decision classifiers that have been trained to receive data (e.g., trajectory data, item-identifier data, weight data, etc.) and generate output data 142 representing an identity of the item and/or an action taken with respect to the item. Similar to the above discussion of classifiers, the decision classifier(s) may have been trained via supervised learning using both positive examples of each type of action and negative examples. In some instances, the decision classifier(s) may be trained to identify item takes (e.g., when an item is placed into the tote 104), item returns (when an item is removed from the tote 104), and/or the like. Further, the output data 142 may be associated with a confidence level. In some instances, this confidence level may be compared to a threshold confidence level and, if the confidence level is less than the threshold, the action may be determined to be unknown.

If, however, the confidence level is greater than the threshold confidence level, then tote 104 and/or other system may update the state of a virtual cart associated with the user 108 operating the tote 104. For example, if the decision component 140 determines, with at least a threshold confidence level, that the user 108 took the identified jar of peanuts, then the tote 104 and/or other system may update a virtual listing of items associated with the user 108 to indicate addition of the item identifier associated with the jar of peanuts. Conversely, if the decision component 140 determines, with at least a threshold confidence level, that the user 108 returned the identified jar of peanuts, then the tote 104 and/or other system may update the virtual listing of items associated with the user 108 to indicate removal of the item identifier associated with the jar of peanuts. It is to be appreciated that the item identifier may comprise a name of the item, a numerical identifier of the item, and/or, in some instances, the string of characters corresponding to the barcode of the item.

The pipeline 124 may continue to process image data generated by the cameras 116 as the user operates the tote 104 within the facility. Once the user 108 has finished their shopping session, the user 108 may end the shopping session in various ways. For instance, the user 108 may return the tote 104 to the tote corral or other storage location, provide input to the tote 104 indicating an end of the shopping session (e.g., utterance, utilize a user interface element on a touch display, etc.), or simply remove item bags or other item carriers from the tote 104 and leave the facility 102. After the user 108 has ended their shopping session, the virtual listing of item identifiers in the virtual item listing may be uploaded to one or more remote servers 120, over one or more networks 122, that manage user accounts for users 108 of the facility 102. The server(s) 120 may charge the appropriate user account for the items 106 in the virtual listing 144 that the user 108 took from the facility 102. For instance, the server(s) 120 may be configured to determine or generate information indicative of a cost of the items 106 picked by the user 108, including the appropriate tax. Additionally, the server(s) 120 may store payment information (e.g., credit card information, bank account information, etc.) for each user account. In this way, when the user 108 finished their shopping session and the tote 104 sends the listing of item identifiers over the network(s) 122 to the server(s) 120, the server(s) 120 may be configured to determine a cost or price for all of the listed item identifiers, and charge the user 108 via their payment information for the items 106 selected during their shopping session. In this way, the user 108 need not go through steps of a traditional check-out experience (e.g., waiting in line for a cashier, scanning items with the cashier, paying for items at the cashier, etc.).

The network(s) 122 may include private networks such as an institutional or personal intranet, public networks such as the Internet, or a combination thereof. The network(s) 122 may utilize wired technologies (e.g., wires, fiber optic cable, and so forth), wireless technologies (e.g., radio frequency, infrared, acoustic, optical, and so forth), or other connection technologies. The network(s) 122 is representative of any type of communication network, including one or more of data networks or voice networks. The network(s) 122 may be implemented using wired infrastructure (e.g., copper cable, fiber optic cable, and so forth), a wireless infrastructure (e.g., cellular, microwave, satellite, etc.), or other connection technologies.

The tote 104 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 122 according to the type of protocol or standard being used. As noted above, in some examples, the servers 120 may perform some or all of the operations described below as being performed by the tote 104. While the servers 120 are illustrated as being in a location outside of the facility 102, in other implementations, at least a portion of the servers 122 may be located at the facility 102.

Figure 2:
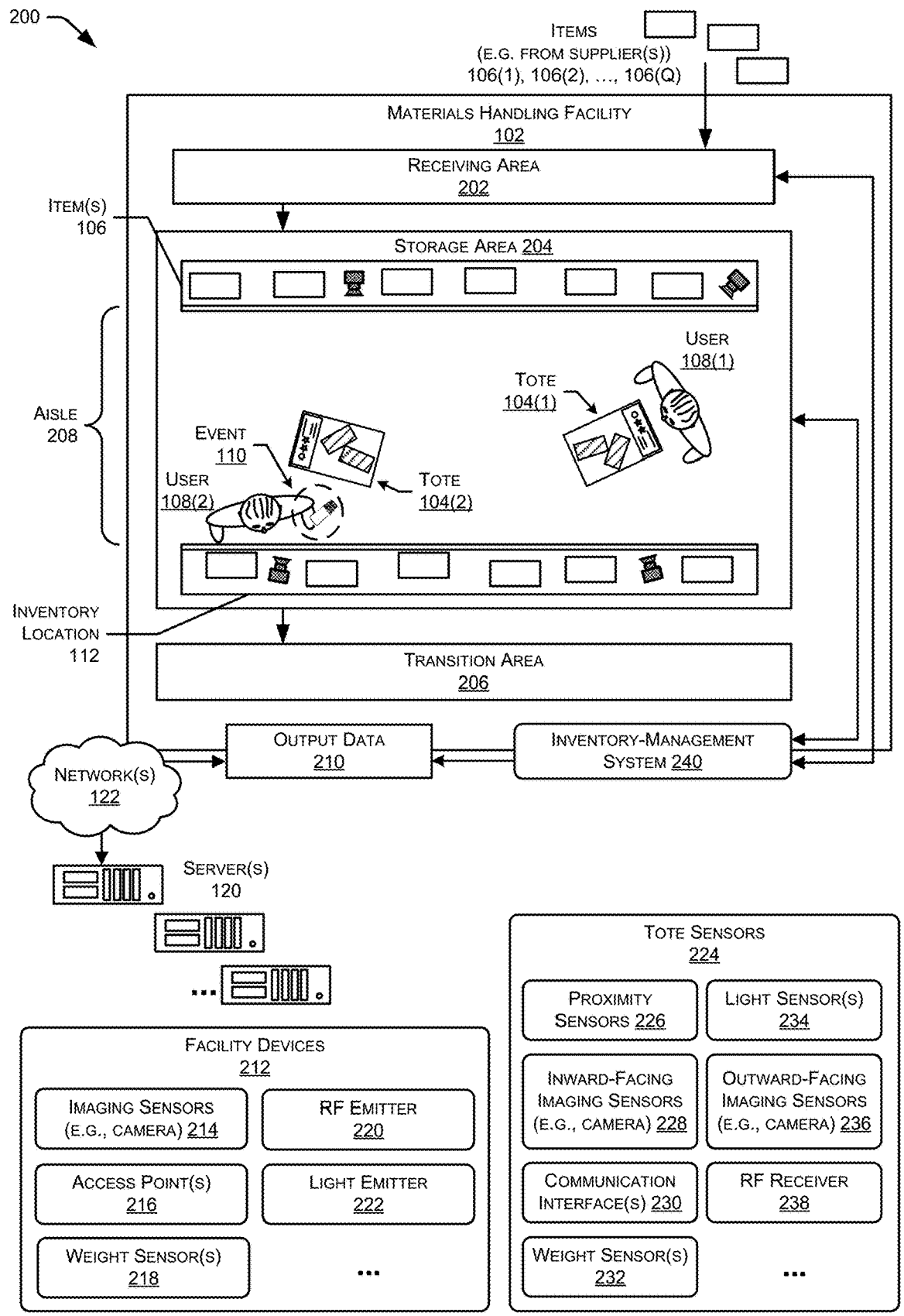
FIG. 2 is a block diagram of an example materials handling facility that includes item-identifying totes, facility and tote sensors, and an inventory-management system configured to generate output regarding events occurring in the tote using sensor data.

FIG. 2 is a block diagram 200 of an example materials handling facility 102 that includes item-identifying totes 104, facility and tote sensors, and an inventory-management system 240 configured to generate output regarding events occurring in the tote 104 using sensor data. However, the following description is merely one illustrative example of an industry and environment in which the techniques described herein may be utilized. It is to be further appreciated that the inventory-management system may reside within the facility 102, remote from the facility 102, or a combination thereof. For example, in some instances components described with reference to the inventory-management system may reside on computing devices at the facility, at the tote 104, and at the servers 120.

An implementation of a materials handling facility 102 configured to store and manage inventory items is illustrated in FIG. 2. A materials handling facility 102 (facility) comprises one or more physical structures or areas within which one or more items 106(1), 106(2), . . . 106(Q) (generally denoted as 106) may be held. As used in this disclosure, letters in parenthesis such as "(Q)" indicate an integer result. The items 106 comprise physical goods, such as books, pharmaceuticals, repair parts, electronic gear, groceries, and so forth.

The facility 102 may include one or more areas designated for different functions with regard to inventory handling. In this illustration, the facility 102 includes a receiving area 202, a storage area 204, and a transition area 206. The receiving area 202 may be configured to accept items 106, such as from suppliers, for intake into the facility 102. For example, the receiving area 202 may include a loading dock at which trucks or other freight conveyances unload the items 106.

The storage area 204 is configured to store the items 106. The storage area 204 may be arranged in various physical configurations. In one implementation, the storage area 204 may include one or more aisles 208. The aisles 208 may be configured with, or defined by, inventory locations 112 on one or both sides of the aisle 208. The inventory locations 112 may include one or more of shelves, racks, cases, cabinets, bins, floor locations, or other suitable storage mechanisms for holding or storing the items 106. The inventory locations 112 may be affixed to the floor or another portion of the facility's structure or may be movable such that the arrangements of aisles 208 may be reconfigurable. In some implementations, the inventory locations 112 may be configured to move independently of an outside operator. For example, the inventory locations 112 may comprise a rack with a power source and a motor, operable by a computing device to allow the rack to move from one location within the facility 102 to another.

One or more users 108(1), 108(2), . . . 108(U), totes 104(1), 104(2), . . . 104(T) (generally denoted as 104) or other material handling apparatus may move within the facility 102. For example, the users 108 may move about within the facility 102 to pick or place the items 106 in various inventory locations 112, placing them on the totes 104 for ease of transport. An individual tote 104 is configured to carry or otherwise transport one or more items 106. For example, a tote 104 may include a basket, a cart, a bag, and so forth. In other implementations, other agencies such as robots, forklifts, cranes, aerial drones, and so forth, may move about the facility 102 picking, placing, or otherwise moving the items 106.

One or more sensors may be configured to acquire information in the facility 102. The sensors in the facility 102 (e.g., facility devices 212) may include sensors fixed in the environment (e.g., ceiling-mounted cameras) or otherwise, such as sensors in the possession of users (e.g., mobile phones, tablets, etc.) or sensors mounted on the totes 104 (e.g., tote sensors 224). The facility sensors 212 may include imaging sensors 214 (e.g., cameras), weight sensor(s) 218, and/or other sensors. The tote sensors 224 may include proximity sensors 226 to detect items 106 being placed in the tote 104, inward-facing imaging sensors 228 to identify items 106 being placed in the tote, communication interfaces 230, weight sensors 232 (e.g., in the bottom of the tote), light sensors 234, outward facing sensors 236, radio frequency (RF) 238, temperature sensors, humidity sensors, vibration sensors, and so forth. The sensors may be, in some examples, in or on the tote 104 or another location in the facility 102. In one example, the bottom of the totes 104 may include weight sensors configured to determine a weight of the items 106 placed thereupon.

During operation of the facility 102, the sensors may be configured to provide information suitable for identifying the movement of items 106 or other occurrences within the tote 104. For example, a series of images acquired by a camera 228/236 may indicate removal of an item 106 from a particular tote 104 by one of the users 108 and/or placement of the item 106 on or at least partially within one of the totes 104.

While the storage area 204 is depicted as having one or more aisles 208, inventory locations 112 storing the items 106, sensors, and so forth, it is understood that the receiving area 202, the transition area 206, or other areas of the facility 102 may be similarly equipped. Furthermore, the arrangement of the various areas within the facility 102 is depicted functionally rather than schematically. For example, multiple different receiving areas 206, storage areas 208, and transition areas 210 may be interspersed rather than segregated in the facility 102.

The totes 104 may include, or be coupled to, an inventory-management system 240. The inventory-management system 240 is configured to identify interactions with and between users 108 and totes 104, in one or more of the receiving area 202, the storage area 204, or the transition area 206. These interactions may include one or more events 110. For example, events 110 may include placing of an item 106 in a tote 104, returning of an item 106 from the tote 104 to an inventory location 112, and so forth. Other events 110 involving users 108 may include the user 108 providing authentication information in the facility 102, using a computing device at the facility 102 to authenticate identity to the inventory-management system 240, and so forth.

By determining the occurrence of one or more of the events 110, the inventory-management system 240 may generate output data 210. The output data 210 comprises information about the event 110. For example, where the event 110 comprises an item 106 being removed from, or placed in, a tote 104, the output data 210 may comprise an item identifier indicative of the particular item 106 that was removed from, or placed in, the tote 104, a quantity of the item 106, a user identifier of a user that removed the item 106, and/or other output data 210.

The inventory-management system 240 may use one or more automated systems to generate the output data 210, such as the pipeline 124 discussed above with reference to FIG. 1 and discussed further below with reference to FIGS. 3A-B, 4, and 5A-B. For example, one or more artificial neural networks, support-vector machines, or other automated machine-learning techniques may be used to process the sensor data and/or image data from the one or more sensors to generate output data 210. The automated systems may operate using probabilistic or non-probabilistic techniques. For example, the automated systems may use a Bayesian network. In another example, the automated systems may use support vector machines to generate the output data 210 or the tentative results. The automated systems may generate confidence level data that provides information indicative of the accuracy or confidence that the output data 210 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 35%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 106 may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 108 may pick an item 106(1) such as a peanut bottle that is generally cylindrical in shape from the inventory location 112. Other items 106 at nearby inventory locations 112 may be predominately spherical. Based on the difference in shape (cylinder vs. sphere) from the adjacent items, and the correspondence in shape with the previously stored image of the peanut bottle item 106(1) (cylindrical and cylindrical), the confidence level that the user 108 has picked up the peanut bottle item 106(1) is high.

In some situations, the automated techniques may be unable to generate output data 210 with a confidence level above a threshold result. For example, the automated techniques may be unable to distinguish which item 106 in large a group of items a user 108 has picked up from the inventory location 112 and placed in the tote 104. In other situations, it may be desirable to provide human confirmation of the event 110 or of the accuracy of the output data 210. For example, some items 106 may be deemed age restricted such that they are to be handled only by users 108 above a minimum age threshold.

In instances where human confirmation is desired, sensor data associated with an event 110 may be processed to generate inquiry data. The inquiry data may include a subset of the sensor data associated with the event 110. The inquiry data may also include one or more of one or more tentative results as determined by the automated techniques, or supplemental data. The subset of the sensor data may be determined using information about the one or more sensors. The subset of the sensor data may include images that may show the item 106 being placed in, or removed from, the tote 104. The subset of the sensor data may also omit images from other cameras that did not have that item 106 in the field of view. The field of view may comprise a portion of the scene in the tote 104 that the camera is able to generate sensor/image data about.

Continuing the example, the subset of the sensor data may comprise a video clip acquired by one or more cameras having a field of view that includes the item 106. The tentative results may comprise the "best guess" as to which items 106 may have been involved in the event 110. For example, the tentative results may comprise results determined by the automated system that have a confidence level above a minimum threshold.

The facility 102 may be configured to receive different kinds of items 106 from various suppliers and to store them until a customer orders or retrieves one or more of the items 106. A general flow of items 106 through the facility 102 is indicated by the arrows of FIG. 2. Specifically, as illustrated in this example, items 106 may be received from one or more suppliers, such as manufacturers, distributors, wholesalers, and so forth, at the receiving area 202. In various implementations, the items 106 may include merchandise, commodities, perishables, or any suitable type of item 106, depending on the nature of the enterprise that operates the facility 102. The receiving of the items 106 may comprise one or more events 110 for which the tote management system 240 may generate output data 210.

Upon being received from a supplier at receiving area 202, the items 106 may be prepared for storage. For example, items 106 may be unpacked or otherwise rearranged. An inventory management system of the facility 102 may include one or more software applications executing on a computer system to provide inventory management functions based on the events 110 associated with the unpacking or rearrangement. These inventory management functions may include maintaining information indicative of the type, quantity, condition, cost, location, weight, or any other suitable parameters with respect to the items 106. The items 106 may be stocked, managed, or dispensed in terms of countable, individual units or multiples, such as packages, cartons, crates, pallets, or other suitable aggregations. Alternatively, some items 106, such as bulk products, commodities, and so forth, may be stored in continuous or arbitrarily divisible amounts that may not be inherently organized into countable units. Such items 106 may be managed in terms of measurable quantity such as units of length, area, volume, weight, time, duration, or other dimensional properties characterized by units of measurement. Generally speaking, a quantity of an item 106 may refer to either a countable number of individual or aggregate units of an item 106 or a measurable amount of an item 106, as appropriate.

After arriving through the receiving area 202, items 106 may be stored within the storage area 204. In some implementations, like items 106 may be stored or displayed together in the inventory locations 112 such as in bins, on shelves, hanging from pegboards, and so forth. In this implementation, all items 106 of a given kind are stored in one inventory location 112. In other implementations, like items 106 may be stored in different inventory locations 112. For example, to optimize retrieval of certain items 106 having frequent turnover within a large physical facility 102, those items 106 may be stored in several different inventory locations 112 to reduce congestion that might occur at a single inventory location 112.

When a customer order specifying one or more items 106 is received, or as a user 108 progresses through the facility 102, the corresponding items 106 may be selected or "picked" from the inventory locations 112 containing those items 106. In various implementations, item picking may range from manual to completely automated picking. For example, in one implementation, a user 108 may have a list of items 106 they desire and may progress through the facility 102 picking items 106 from inventory locations 112 within the storage area 204 and placing those items 106 into a tote 104. In other implementations, employees of the facility 102 may pick items 106 using written or electronic pick lists derived from customer orders. These picked items 106 may be placed into the tote 104 as the employee progresses through the facility 102. Picking may comprise one or more events 110, such as the user 108 in moving to the inventory location 112, retrieval of the item 106 from the inventory location 112, and so forth.

After items 106 have been picked, they may be processed at a transition area 206. The transition area 206 may be any designated area within the facility 102 where items 106 are transitioned from one location to another or from one entity to another. For example, the transition area 206 may be a packing station within the facility 102. When the item 106 arrives at the transition area 206, the items 106 may be transitioned from the storage area 204 to the packing station. Information about the transition may be maintained by the tote management system 240 using the output data 210 associated with those events 110.

In another example, if the items 106 are departing the facility 102 a list of the items 106 may be used by the tote management system 240 to transition responsibility for, or custody of, the items 106 from the facility 102 to another entity. For example, a carrier may accept the items 106 for transport with that carrier accepting responsibility for the items 106 indicated in the list. In another example, a customer may purchase or rent the items 106 and remove the items 106 from the facility 102.

The inventory-management system 240 may access or generate sensor data about the items 106, the users 108, the totes 104, and so forth. The sensor data may be acquired by one or more of the sensors, data provided by other systems, and so forth. For example, the sensors may include cameras configured to acquire image data of items 106 placed in the totes 104. The image data may comprise still images, video, or a combination thereof. The image data may be processed by the tote management system 240 to determine an item identifier for the items 106, a listing of items in the tote 104 for a user 108, and so forth. As used herein, the identity of the user of a tote 104 may represent a unique identifier of the user (e.g., name, number associated with user, username, etc.), an identifier that distinguishes the user amongst other users being identified with the environment, or the like.

The inventory-management system 240, or systems coupled thereto, may be configured to identify the user 108. In one implementation, this determination may comprise comparing sensor data with previously stored identity data. For example, the user 108 may be identified by showing their face to a facial recognition system, by presenting a token carrying authentication credentials, providing a fingerprint, scanning a barcode or other type of unique identifier upon entering the facility, and so forth. Identity of the user 108 may be determined before, during, or after entry to the facility 102 and/or interaction with a tote 104. Determination of the user's 216 identity may comprise comparing sensor data associated with the user 108 in the facility 102 and/or with the tote 104 to previously stored user data. In some examples, the output data 210 may be transmitted over a network 226 to server(s) 120.

Figure 3A:
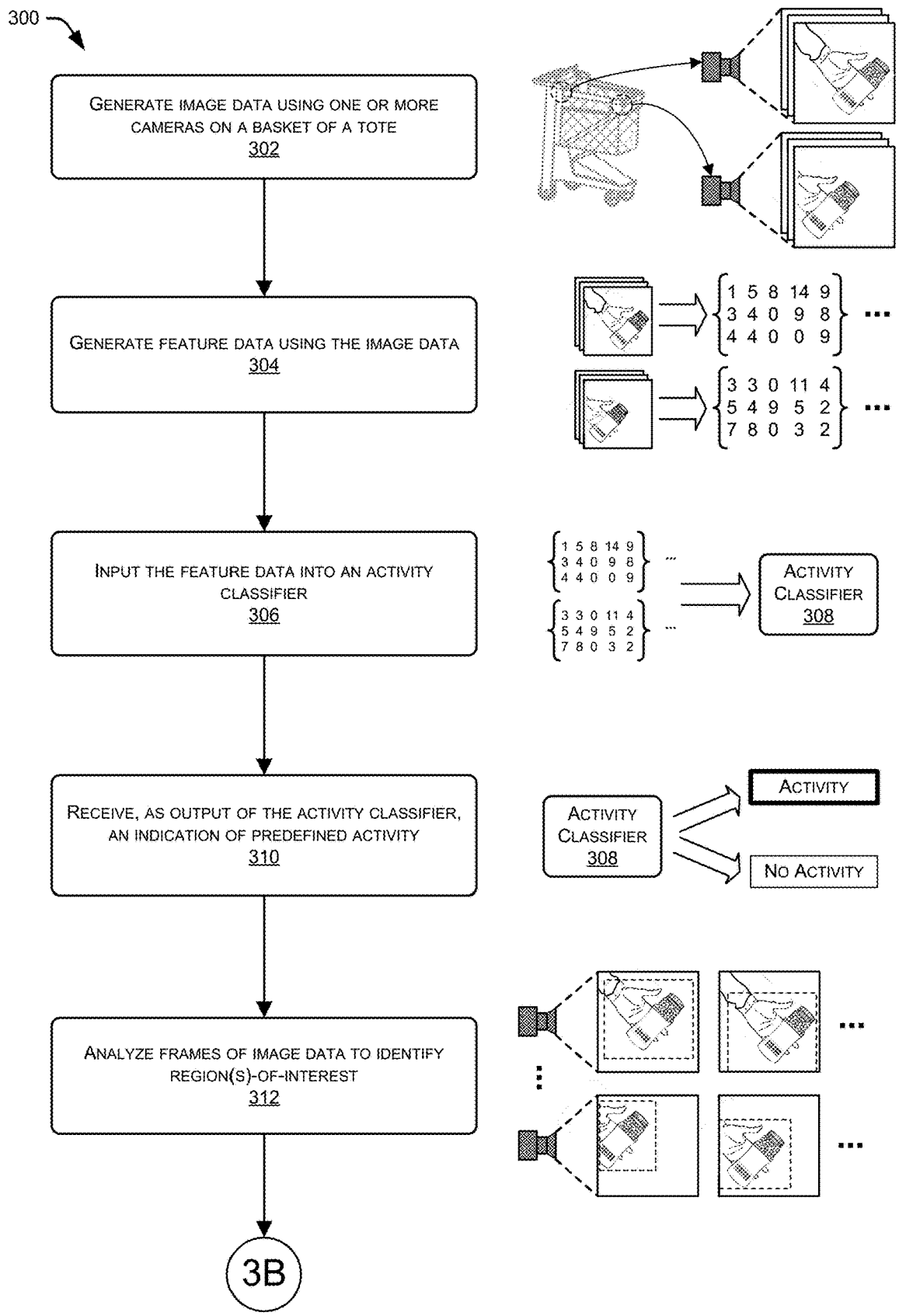
FIGS. 3A and 3B illustrate a flow diagram of an example process of an item-identifying tote generating image data, determining that the image data represents predefined activity, segmenting image frames to identify regions-of-interest, determining a trajectory of these regions-of-interest interest, and determining an identifier of any such items and an action taken with respect to these items.
Figure 3B:
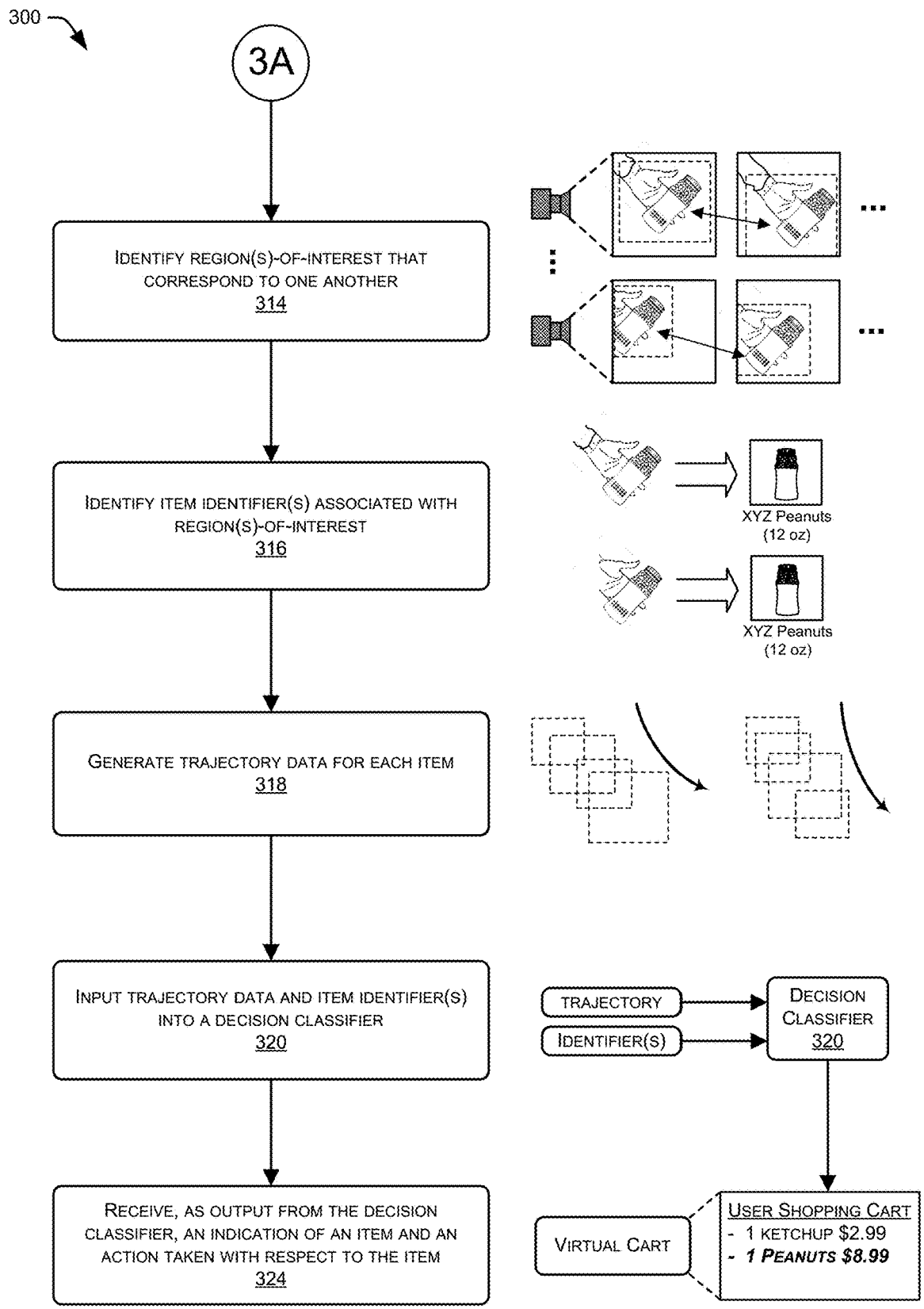

FIGS. 3A and 3B illustrate a flow diagram of an example process 300 of an item-identifying tote generating image data, determining that the image data represents predefined activity, segmenting image frames to identify regions-of-interest, determining a trajectory of a common item represented in these regions-of-interest, and determining an identifier of any such items and an action taken with respect to these items. In some examples, some or all of the process 300 may be performed by components of the pipeline 124.

At an operation 302, one or more cameras mounted to a basket of a tote may generate image data. For example, a first camera mounted on a first side of the basket may generate image data, as may a second camera mounted on a second side of the basket. In some instances, a camera is mounted on each corner of the basket of the tote, with each camera generally directed inwards towards airspace associated with the basket.

At an operation 304, the activity-detection component 126 may generate feature data using the image data. In some instances, the activity-detection component 126 may first combine the image data generated by each of the cameras that generated the image data at the operation 302 before generating the feature data. The feature data, meanwhile, may represent an array of features of the combined feature data, such as pixel color values, motion vectors, and the like.

At an operation 306, the activity-detection component 126 inputs the feature data into an activity classifier 308. As described above, the activity classifier may have been trained to identify predefined activity, such as activity that occurs within the airspace of the basket of the tote. That is, the activity classifier 308 may be trained to identify activity that is visible to each of the cameras pointed towards the basket of the tote, while disregarding activity outside of the basket area. By doing so, the activity-detection component 126 identifies activities such as a user placing an item into the basket of the tote or removing an item therefrom, while disregarding users walking by the cart, an associate of the facility stocking a shelf, or the like.

At an operation 310, the activity-detection component 126 or the segmentation component 130 receives, as output of the activity classifier 308, an indication that predefined activity has been detected. For example, this output data may comprise an indication that the activity classifier 308 has assigned a positive label to the image data.

At an operation 312, and at least partly in response to receiving this indication, the segmentation component 130 may begin analyzing the image data to identify any regions-of-interest (e.g., a bounding box or other location data indicating a portion of the image data representing a potential item of interest). For example, the segmentation component may analyze first image data (from which the predefined activity may have been detected or otherwise) to identify a first region-of-interest, may analyze second image data that was generated subsequent to the first image data to identify a second region-of-interest, and so forth. In some instances, the segmentation component 130 may analyze the image data by each camera independently to identify the region(s)-of-interest. Further, it is to be appreciated that while FIG. 3A illustrates identifying a single region-of-interest in each illustrated image frame, in other instances the segmentation component may identify multiple regions-of-interest in individual frames, as illustrated and discussed with reference to FIG. 4.

FIG. 3B continues the illustration of the process 300 and includes, at an operation 314, the segmentation component 130 identifying regions(s)-of-interest that correspond to one another across frames. For example, the segmentation component 130 may determine that the first region-of-interest identified in the first image data may correspond to the second region-of-interest identified in the second image data. That is, the segmentation component 130 may determine that the first and second regions-of-interest represent one or more common items, such as the same product, a hand of a user, and/or the like. To do so, the segmentation component 130 may analyze image data associated with the first region-of-interest with respect to image data associated with the second region-of-interest. For example, the segmentation component 130 may compare visual characteristics of the region-of-interest in the first image data to visual characteristics of the region-of-interest of the second image data to determine that these respective portions of image data represent the common item at different times. Additionally. or alternatively, the segmentation component may determine an item or characteristics of an item represented by the region-of-interest of the first image data, as well as an item or characteristics of an item represented by the region-of-interest of the second image data. The segmentation component may then determine whether the first and second regions-of-interest represent the same item. For example, the segmentation component may analyze (e.g., using a trained classifier) to determine that the first region-of-interest represents or is likely to represent a first particular item. In addition, the segmentation component may analyze (e.g., using the trained classifier) to determine that the second region-of-interest represents or is likely to represent the first particular item. If so, then the segmentation component determines that these regions-of-interest correspond to one another, regardless of which techniques the segmentation component 130 uses to determine that regions-of-interest correspond to one another, the segmentation component 130 may store an indication that each of these items-of-interest corresponds to a common item identifier.

At an operation 316, an item-identification component may identify an item identifier associated with each region-of-interest. For example, the item-identification component may use computer-vision algorithms to identify each item, such as the illustrated jar of peanuts. As described above, the item-identification component may identify the items using barcodes, visual indicia, weight data, and/or the like.

At an operation 318, the tracking component 134 may generate trajectory data for each item represented by one or more regions-of-interest. In the example from above, for instance, the trajectory component 134 may use the information indicating that the first and second regions-of-interest comprise a common item, along with the first and second locations of this common item to generate trajectory data indicating a trajectory of the common item. Of course, while this example describes using the first and second locations, it is to be appreciated that the trajectory component 134 may use multiple additional frames of image data to generate the trajectory data. Further, given that the segmentation component 130 and the trajectory component 134 may perform their respective functionality on image data generated by the cameras individually, in some instances the trajectory component 134 may generate multiple pieces of trajectory data for a single item. For example, and as illustrated, the trajectory component 134 may generate first trajectory data for the jar of peanuts (from the perspective of the first camera), second trajectory data for the jar of peanuts (from the perspective of the second camera), and so forth.

An operation 320 represents inputting the trajectory data and/or the item identifiers into a decision classifier 320. That is, the item identifier(s) identified by the item-identification component at the operation 316 and/or the trajectory data generated by the trajectory component 134 may be input into the decision classifier 320, which may take this data and/or additional data to generate output data representing an identity of an item and an action performed with respect to the item. As described above, the decision classifier 320 may comprise a classifier trained using supervised learning or other techniques for outputting result data and a corresponding confidence level.

At an operation 324, the decision component 140 receives, as output from the decision classifier 320, an indication of an item and an action taken with respect to the item. That is, the decision classifier 320 may provide item-identification data identifying an item (e.g., the jar of peanuts) and an action taken with reference to the item (e.g., take, return, unknown, etc.). In some instances, the output of the decision classifier 320 may also comprise a confidence level, which may be compared to a threshold confidence level. If the confidence level is higher than the threshold confidence level, then a virtual cart of the user may be updated to reflect the item and the action. For example, an item identifier of the item may be stored in a virtual cart associated with the user.

Figure 4:
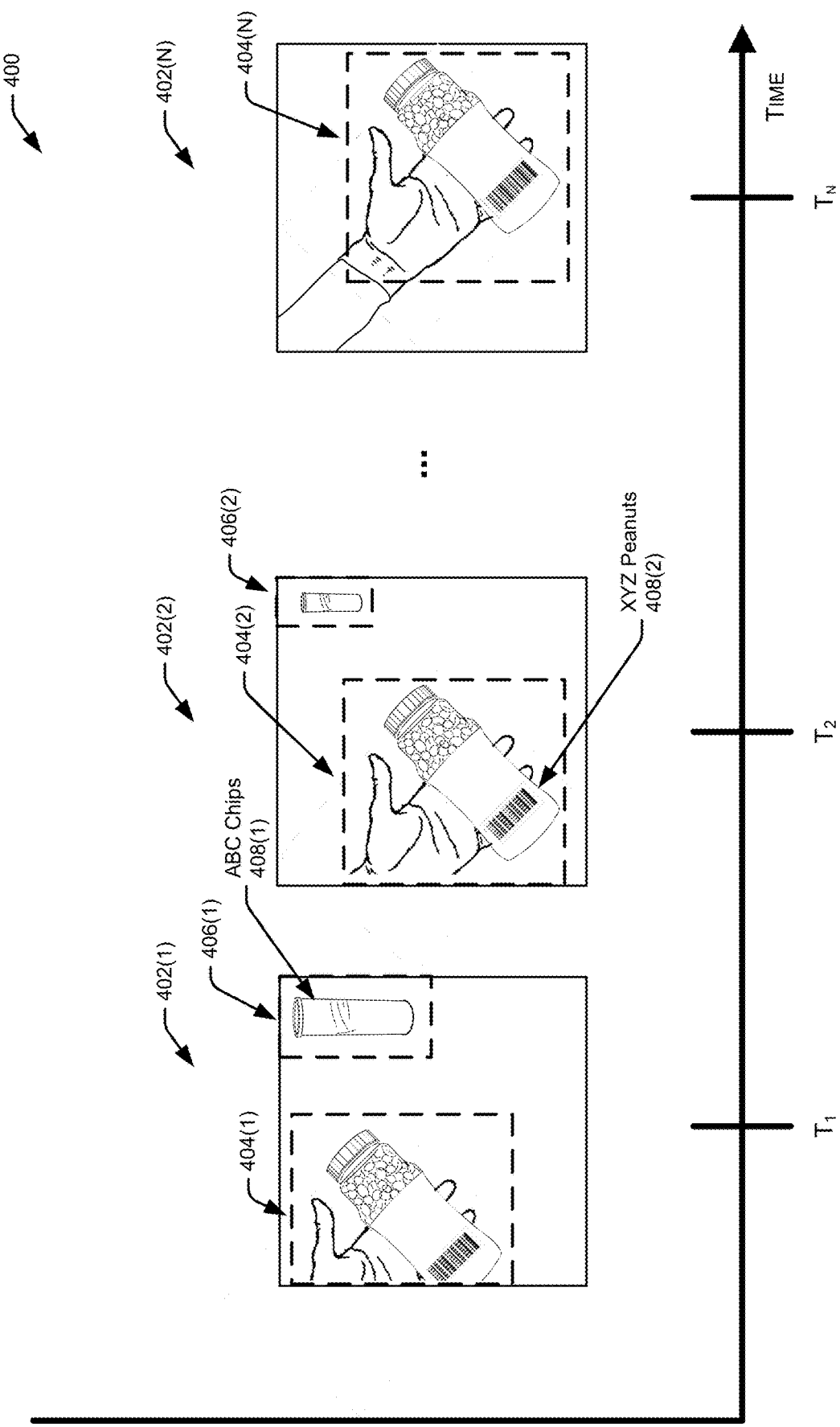
FIG. 4 illustrates a representation of how the trajectory component may generate trajectory data for regions-of-interest over time. As illustrated, in some instances a single frame may be associated with multiple regions-of-interest.

FIG. 4 illustrates a representation 400 of how the trajectory component may generate trajectory data for regions-of-interest over time. As illustrated, in some instances a single frame may be associated with multiple regions-of-interest.

To begin, the illustrated representation 400 illustrates example image frames captured by a camera over time. For example, the representation 400 includes a first frame 402(1) associated with a first time ($T_1$), a second frame 402(2) associated with a second time ($T_2$), and an $N^{th}$ frame 402(N) associated with an $N^{th}$ time ($T_N$). As illustrated, the segmentation component 130 has identified two regions-of-interest 404(1) and 406(1) in the first frame 402(1), two regions-of-interest 404(2) and 406(2) in the second frame 402(2), and a single region-of-interest 404(N) in the $N^{th}$ frame 402(N).

In response to identifying the two regions-of-interest 404(1) and 406(1) in the first frame 402(1), the segmentation component 130 may determine, for each respective region-of-interest, whether the region-of-interest corresponds to a region-of-interest in a previous frame. If not, then the segmentation component 130 may determine that a new region-of-interest has been identified and stores identification data associated with the new region-of-interest. For purposes of discussion, the segmentation component 130 determines that each of the two regions-of-interest 404(1) and 406(1) in the first frame 402(1) are new (i.e., first identified in the first frame 402(1)).

In response to identifying the two regions of interest 404(2) and 406(2) in the second frame 402(2), meanwhile, the segmentation component 130 may determine, for each region-of-interest, whether the respective region-of-interest corresponds to a previously identified region-of-interest. As described above, this may include computing a similarity between a region-of-interest and one or more previously identified regions-of-interest. For example, the segmentation component 130 may compare feature data from the respective region-of-interest to each of the one or more previously identified regions-of-interest to compute a respective similarity between these regions-of-interest. In some instances, the respective region-of-interest may be deemed to correspond to the previously identified region-of-interest having the highest computed similarity, assuming that this similarity is greater than a threshold similarity. In another example, the segmentation component 130 may determine (e.g., using a trained classifier(s)) one or more items represented or likely represented by the respective region-of-interest, as well as one or more items represented or likely represented by each of the one or more previously identified regions-of-interest. If the respective region-of-interest is determined to represent the same item(s) as a previously identified region-of-interest, then the segmentation component may determine that these regions-of-interest correspond to one another.

In this example, the segmentation component 130 determines that the region-of-interest 404(2) corresponds to the region-of-interest 404(1) and, thus, stores data indicating that these regions-of-interest correspond to one another and, thus, represent a common item. In addition, the segmentation component 130 determines that the region-of-interest 406(2) corresponds to the region-of-interest 406(1) and, thus, stores data indicating that these regions-of-interest correspond to one another and, thus, represent a common item. In addition, segmentation component 130 may determine that the region-of-interest 404(3) represented in the frame 402(N) also corresponds to the regions-of-interest 404(1) and 404(2) and, thus, stores data indicating this correspondence.

After the segmentation component identifies the respective regions-of-interest and the correspondences therebetween, the tracking component 134 may generate trajectory data associated with each common item represented the region-of-interest group. For example, the trajectory component 134 may identify a trajectory of the common item illustrated in the regions-of-interest 404(1)-(N) based on the location of each of these regions-of-interest 404(1)-(N) over time. Further, the trajectory component may identify a trajectory of the common item illustrated by the regions-of-interest 406(1)-(2) based on the location of each of these regions-of-interest 406(1)-(2). The trajectory component may then provide both of these example trajectory data to the decision component 140, as described above.

In addition, an item-identification (e.g., component 534) may function to identify the common item represented by one or more of the regions-of-interest 404(1)-(N) and 406(1)-(2). For example, the item-identification component may use visual characteristics of the respective regions-of-interest, weight data, and/or any other type of sensor data to identify one or more items. In the illustrated example, the item-identification component has identified a first item ("ABC chips") 408(1) (common to the regions-of-interest 406(1)-(2)) from the first image frame 402(1) and a second item ("XYZ Peanuts") 408(2) (common to the regions-ofinterest 404(1)-(N)) from the second image frame 402(2). The item-identification component may then provide this item-identification data to the decision component 140, as described above.

Figure 5:
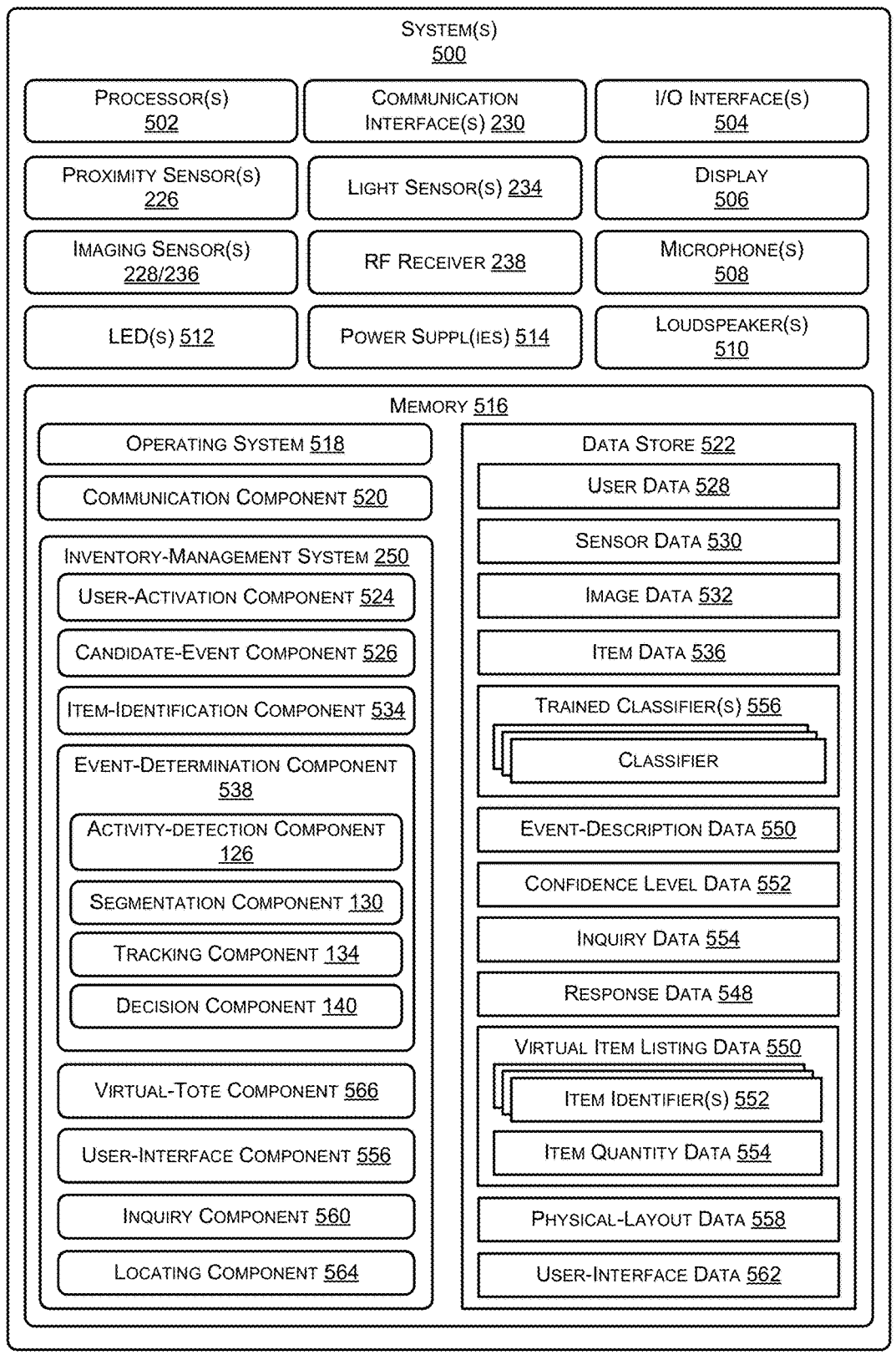
FIG. 5 illustrates example components of one or more systems configured to support an inventory-management system. In some instances, the systems may comprise a tote, one or more computing devices within a facility, one or more computing devices that are remote from the facility, and/or a combination thereof.

FIG. 5 illustrates example components of one or more systems 500 configured to support an inventory-management system. In some instances, the systems may comprise a tote, one or more computing devices within a facility, one or more computing devices that are remote from the facility, and/or a combination thereof.

The systems 500 may include one or more hardware processors 502 (processors) configured to execute one or more stored instructions. The processors 502 may comprise one or more cores. The systems 500 may include one or more input/output (I/O) interface(s) 504 to allow the processor 502 or other components to communicate with other devices. The I/O interfaces 504 may comprise Inter-Integrated Circuit (I2C), Serial Peripheral Interface bus (SPI), Universal Serial Bus (USB) as promulgated by the USB Implementers Forum, and so forth. The I/O interfaces 504 may allow the various modules/components to communicate with each other and/or control each other.

The systems 500 may also include one or more communication interfaces 230. The communication interfaces 230 are configured to provide communications between devices, such as the tote 104, the server(s) 120, sensors, interface devices, routers, and so forth. The communication interfaces 230 may include devices configured to couple to personal area networks (PANs), wired and wireless local area networks (LANs), wired and wireless wide area networks (WANs), and so forth. For example, the communication interfaces 230 may include devices compatible with Ethernet, Wi-Fi™, Bluetooth®, and so forth. The systems 500 may also include one or more busses or other internal communications hardware or software that allow for the transfer of data between the various modules and components.

The systems 500, such as the tote 104, may also include one or more proximity sensors 508, a camera (or other imaging device 228/236), and one or more LEDs 512. The proximity sensor(s) 508 may comprise any type of sensor that is able to detect the presence of nearby objects without the need for physical contact (e.g., ToF sensors, PIR sensors, etc.). The cameras in each of the capture assemblies may comprise any type of camera or imaging device configured to generate image data (and/or video data), or information descriptive of a plurality of picture elements or pixels. The LED(s) 512 may be selectively activated to emit light at any wavelength, visible or non-visible to users 108.

The systems 500 may include one or more power suppl(ies) 514 to provide power to the components. The power suppl(ies) 514 may also include a secondary (e.g., internal) power supply to allow for hot swapping of battery pack modules, such as one or more capacitors, internal batteries, etc.

The systems 500, such as the tote 104, may also include a display 506 configured to display image data, such as pictures, videos, user interface elements, and/or any other image data. The display 506 may comprise any type of display 506, and may further be a touch screen to receive touch input from a user 108. The tote 104 may also include one or more microphones 520 and one or more loudspeakers 522 to facilitate a dialogue with a user 108, and/or to receive feedback from the user 108. The microphone(s) 520 may capture sound representing the user's speech, and the loudspeaker(s) 522 may output machine-generated words to facilitate a dialogue, prompt a user 108 for feedback on an item 106 and/or for other information, and/or output other alerts or notifications.

The systems 500 may include one or more memories 516 (e.g., in an electronics box module along with the processor(s) 502). The memory 516 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 516 provides storage of computer-readable instructions, data structures, program modules, and other data for the operation of the systems 500. A few example functional modules are shown stored in the memory 516, although the same functionality may alternatively be implemented in hardware, firmware, or as a system on a chip (SOC).

The memory 516 may include at least one operating system (OS) component 518. The OS component 518 is configured to manage hardware resource devices such as the I/O interfaces 504, the communication interfaces 230, and provide various services to applications or components executing on the processors 502. The OS component 518 may implement a variant of the FreeBSD™ operating system as promulgated by the FreeBSD Project: other UNIX™ or UNIX-like variants: a variation of the Linux™ operating system as promulgated by Linus Torvalds: the Windows® Server operating system from Microsoft Corporation of Redmond, Washington, USA; and so forth.

One or more of the following components may also be stored in the memory 516. These components may be executed as foreground applications, background tasks, daemons, and so forth. A communication component 520 may be configured to establish communications with one or more of the sensors, one or more of the servers 120, or other devices. The communications may be authenticated, encrypted, and so forth.

The memory 516 may further store the inventory-management system 240. The inventory-management system 240 is configured, in part, to provide the item-identifying functions (and other functions) provided by the tote 104 as described herein. For example, the inventory-management system 240 may be detect items 106, identify items 106, and maintain a virtual item listing for a user 108 of the tote 104.

The inventory-management system 240 may include a user-activation component 524 that performs operations for activating a shopping session using a tote 104 on behalf of a user 108. For instance, a user 108 may have previously registered for a user account with an operator of the facility to utilize various automated management services provided by an operator of the facility 102. The user 108 may have registered for a user account, such as by providing user data 528, to automate payments made for items taken by the user and included a payment means (e.g., credit card, bank account number, etc.), and may have also provided an identification means in the user data 528 to the user-activation component 524 such that the tote 104 can recognize the user 108. For instance, the user 108 may have registered to identify themselves to the tote 104 using any identification technique by the user-activation component 524, such as by providing user data 528 by presenting an identification means to a camera/scanner 228 (e.g., presenting a driver's license, presenting a facility-issued card, presenting a user identifier via a mobile phone, etc.), speaking a predefined utterance that is captured by the microphone(s) 508 (e.g., a name of the user, a predefined keyword, etc.), and/or looking into a camera 228/236 for facial recognition. Once a user 108 has identified themselves to using the user-activation component 524, the user-activation component 524 may open a shopping session where the tote 104 identifies and track items 106 retrieved by the user 108 and placed in the tote 104.

The inventory-management system 240 may additionally include a candidate-event component 526 configured to detect items 106 (or objects) within a particular proximity to the tote. For example, one or more proximity sensor(s) 226 may generate sensor data 530) that indicates a distance between the proximity sensor(s) 226 and any objects located in the FOV of the proximity sensor(s) 228/236. The candidate-event component 526 may analyze the sensor data 530 and determine if an object is within a threshold distance indicating that the object is near the tote 104 and/or within or near the perimeter of the top of the tote 104 (e.g., one foot from the proximity sensor(s) 226, two feet from the proximity sensor(s) 226, etc.). In this way, the proximity sensor(s) 226 may generate sensor data 530 that indicates whether or not an item 106 is being moved in or out of the tote 104. However, in some examples, rather than using sensor data 530 generated by a proximity sensor(s) 226, the candidate-event component 526 may utilize image data 532 generated by the camera(s) 228/236 to determine if an object is within a threshold distance from the tote 104.

The inventory-management system 240 may further include a strobing component configured to cause the LED(s) 512 and/or shutters of the camera(s) 228 to strobe according to different frequencies. The LED(s) 512 may emit light in any light spectrum (e.g., infrared, near infrared, visible, etc.). However, some items 106 may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the LED(s) 512 to emit light in the visible spectrum. When generating image data 532 using camera(s) 228/236, motion blur may appear when capturing fact moving objects. However, the motion blur may be reduced or eliminated by exposing the camera(s) 228/236 imager for a short (e.g., sub-millisecond) durations. Accordingly, the strobing component may strobe the opening and closing of shutters of the camera(s) 228/236 to limit the sensor exposure duration. Additionally, the strobing component may cause the LEDs to emit/strobe light at a particular frequency.

In some examples, the image data 536 may include 2D representations of the items 106, and/or 3D representations of the items 106. For instance, the imaging sensor(s) 228/236 may include 3D imaging devices or cameras that generate 3D models or representations of the items 106 that are placed in, or removed from, the tote 104. Thus, the image data may include 2D representations and/or 3D representations of the items 106 that may be utilized to identify the items 106 as described herein. The inventory-management system 240 may also include an item-identification component 534 configured to analyze image data 532 to identify an item 106 represented in the image data 532.

In some examples, the data store 522 may include physical-layout data 558 that is used by the item-identification component 534 to determine the item 106. The physical-layout data 558 may include or provide a mapping of physical locations within the physical layout of devices and objects such that the location of the tote 104 may be utilized to determine an item 106 stored nearby. The physical-layout data 558 may indicate the coordinates within the facility 102 of an inventory location 112, items 106 stored at that inventory location 112, and so forth. In examples where the tote 104 has location determining sensors (e.g., GPS, RFID, proximity, etc.), the location sensor data may be used to determine where in the store the user 108 is. In such examples, the item-identification component 534 may access the physical-layout data 558 to determine if a location associated with the event is associated with items 106, and confidence levels for the corresponding representations of items in the item data 558. Continuing the example above, given the location within the facility 102 of the event and image camera data, the physical-layout data 558 may determine the items 106 that may have been represented in generated images of the event 110.

The inventory-management system 240 may further include an event-determination component 538 to determine event-description data 560 for the item 106 in the image data 532. The event-determination component 538 may determine if the user 108 is adding an item 106 to the tote 104, removing the item from the tote 104, etc., based on movement of the item 106 and/or whether the item is shown in the image data 532. For instance, if the item 106 is shown as being moved downward towards the interior of the tote 104, and the user's hand 108 then leaves the tote 104 without the item, 106 it can be determined that the user 108 added the item 106 to the tote 104. Similarly, if the user's hand 108 moves into the tote without an item 106 and is depicted in the image data 532 taking an item 106 from the tote, the event-determination component 538 may determine that the user 108 removed an item 106 from the tote 104. In some examples, the event-determination component 538 may analyze a trajectory of the hand of the user 106 to determine, using two or more images representing the hand over time, whether the trajectory of the item 106 is moving into the tote 104, or out of the tote 104. The event-determination component 538 may include the activity-detection component 126, the segmentation component 130, the tracking component 134, and the decision component 140, described above.

The inventory-management system 240 may also include a virtual-tote management component 566 configured to manage virtual item listing data 460 for the systems 500. For instance, the virtual-tote management component 452 may utilize the item data 536, event-description data 538, and confidence level data 452 to add item identifier(s) 462 to the virtual item listing data 460 for items 106 that were added to the tote 104, remove item identifier(s) 462 from the virtual item listing data 460 for items 106 that were removed from the tote 104, and track item quantity data 554 indicating quantities of particular items 106 in the tote 104.

The inventory-management system 240 may further include a user-interface component 556 configured to present user interfaces on the display 506 based on user-interface data 562. The user interfaces 562 may include one or more fields to present data, and/or receive touch input (or other input via a keyboard, mouse, etc.) from a user 108. For instance, if the item-identification component 534 is unable to determine an item identifier 462 for an item 106 shown in the image data 532, the user-interface component 556 may receive inquiry data 544 generated by an inquiry component 560 to prompt a user 108 or a human associate at the facility 102 for feedback to help identify the item 106, and/or other information (e.g., if multiple items were placed in the tote 104). The inquiry component 560 may be configured to generate inquiry data 544 based on the information needed to identify the item 106. For instance, the inquiry data 544 may include a prompt to request particular feedback from the user 108 or the associate, such as to provide input (e.g., touch input, vocal/utterance input, etc.) to identify the item 106, input to indicate how many items 106 were added to the tote, input to indicate whether an item 106 was removed or added, etc. In some examples, the user-interface component 556 may present one or more images depicting items from the item data 558 that have the highest confidence levels as corresponding to the item 106 in the image data 536, but confidence levels that are not high enough to make a final decision as to the item 106. For instance, the user-interface component 556 may present pictures of two different items that have high confidence levels 452 and request that the user 108 select or indicate the appropriate item 106. Additionally, or alternatively, the user-interface component 556 may present user-interface data 562 that prompts the user for feedback regarding whether or not the item 106 was added to, or removed from the tote 104.

In some examples, the inventory-management system 240 may further include a locating component 564 configured to determine locations of the tote 104 in the facility 102. For instance, the locating component 564 may analyze sensor data 530 collected by sensors of the tote 104 to determine a location. In some examples, the communication interface(s) 230) may include network interfaces that configured the tote 104 to receive or detect wireless signals (e.g., WiFi signals, Bluetooth signals, etc.) and generate sensor data 530 indicative of the signals. The locating component 564 may analyze the sensor data 530 using various techniques to identify the location of the tote 104, such as WiFi triangulation, received signal strength indicators (RSSI), and/or other methods for analyzing wireless signals to determine a location of the tote 104. In some instances, the facility 102 may include various infrared (IR) or near-IR emitters at different locations that emit light according to frequencies, patterns, etc. that indicate the different locations in the facility 102. In such examples, the tote 104 may utilize a light sensor 234 to generate the sensor data 530 representing the IR or NIR and determine the location of the tote 104 in the facility. In some instances, there may be visible landmarks or markers throughout the facility that indicate a location in the facility, and the locating component 564 may analyze image data 532 generated by an outward facing camera 236 to determine a location of the tote 104. As another example, there may be various radio frequency (RF) emitters positioned throughout the store, and the tote 104 may utilize the RF receiver 238 to allow the locating component 564 to perform RF beaconing to determine the location of the tote 104. The locating component 564 may perform one, or any combination, of the above techniques to determine a location of the tote 104 in the facility 102 and/or any other technique known in the art.

The locating component 564 may perform various operations based on determining the location of the tote 104 within the facility 102. For instance, the locating component 564 may cause user interface data 560 to be presented on the display 506 that includes a map of the facility 102 and/or directions to an item 106 for the user of the tote 104. Additionally, or alternatively, the locating component 564 may utilize the location of the tote, the physical-layout data 556, and/or item data 536 and "push" user interfaces to the display 506 that indicate various location-based information, such as indications of deals for items 106 located nearby, indications of items 106 located nearby and on the user's shopping list, and/or other user interface data 560.

Figure 6A:
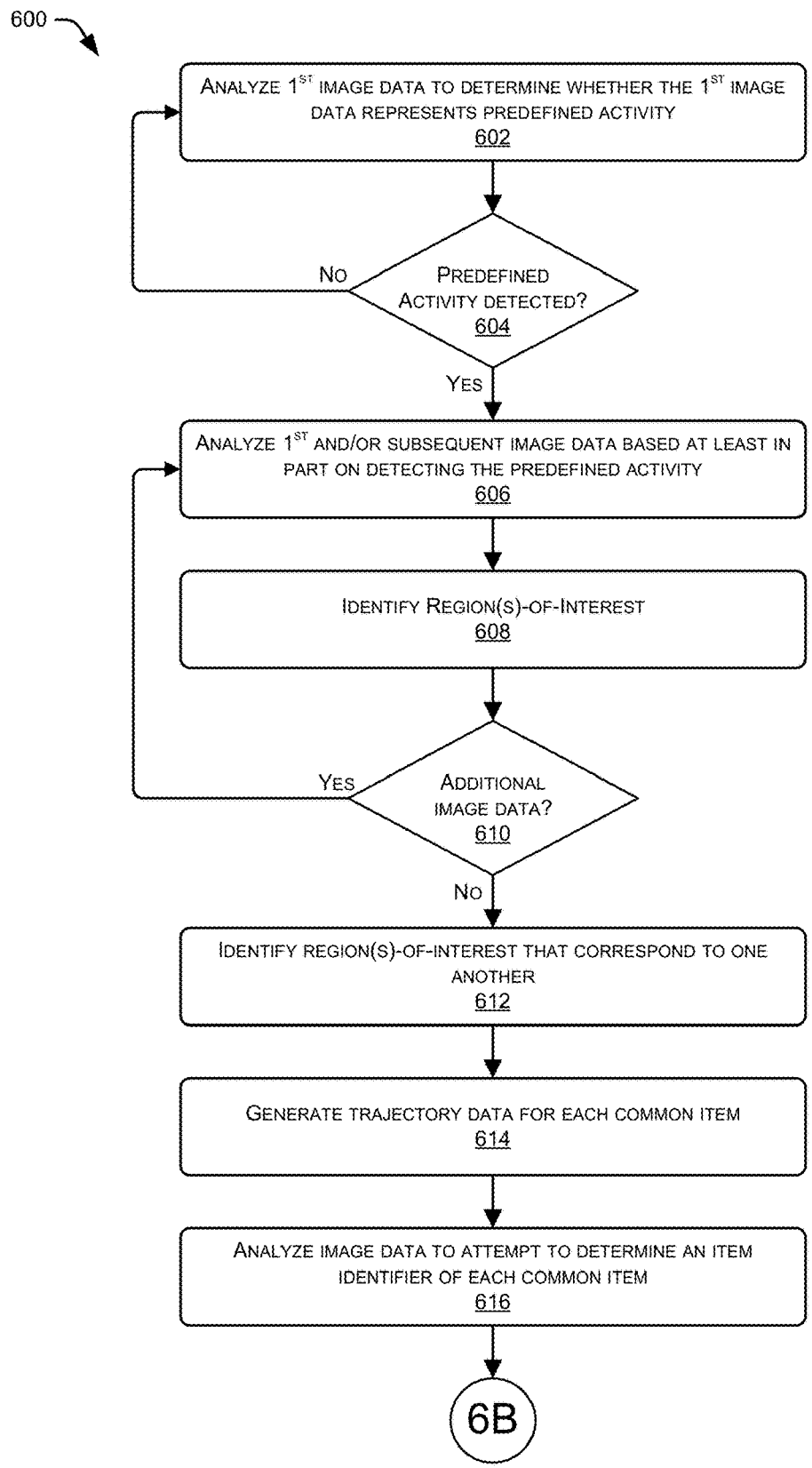
FIGS. 6A-B illustrates a flow diagram of an example process for detecting predefined activity in image data, analyzing the image data to identify a region-of-interest generating trajectory data using these locations over multiple frames of image data, and determining the identity of the item and an action taken with respect to the item.
Figure 6B:
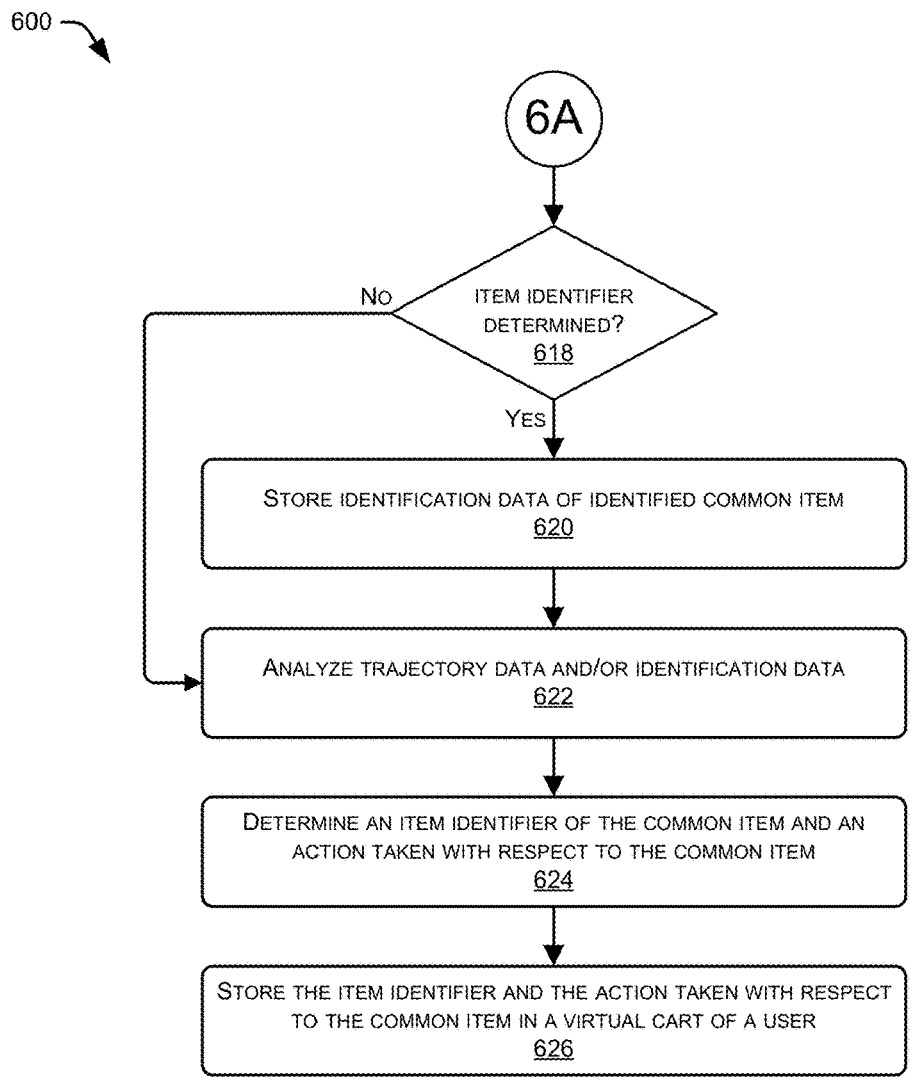

FIGS. 6A-B illustrates a flow diagram of an example process 600 for detecting predefined activity in image data, analyzing the image data to identify an item-of-interest and a location of the item-of-interest in the image data, generating trajectory data using these locations over multiple frames of image data, and determining the identity of the item and an action taken with respect to the item. The process 600 discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In addition, these processes may be performed by the tote 104, the servers 120, other computing devices, or a combination thereof.

At an operation 602, a system, such as one or more of the system(s) 500 described above, may analyze first image data to determine whether the first image data represents predefined activity. For example, this operation may include generating feature data based at least in part on the first image data and inputting the feature data into an activity classifier.

At an operation 604, the system determines whether the first image data represents the predefined activity. For example, the operation 604 may comprise receiving an output from the activity classifier indicating whether the first image data is associated with a first label indicating that the first image data represents the predefined activity, or whether the first image data is associated with a second label indicating that the first image data does not represent the predefined activity. If the operation 604 determines that the first image data does not represent the predefined activity, then the process 600 returns to the operation 602 to continue to analyze image data for detecting the predefined activity.

If, however, the operation 604 determines that the first image data represents the predefined activity (e.g., based on an output from the activity classifier), then at an operation 606 the system analyzes the first image data and/or subsequent image data. For example, the operation 606 may comprise inputting the image data, and/or feature data generated therefrom, into a localization component trained to identify one or more regions-of-interest represented by the image data. For example, the segmentation component, described above, may utilize a localization component to identify a region(s) of the image data that illustrates a potential item-of-interest (e.g., a product, hand, etc.).

At an operation 608, the system identifies one or more region(s)-of-interest. In some instances, this operation 608 comprises outputting location data (e.g., a bounding box, a pixel mask, etc.) indicating a portion of the image data that represents a potential item-of-interest. In some instances, the operation 608 may identify multiple respective regions-of-interest in the image data.

At an operation 610, the system determines whether to analyze additional image data and, if so, the operation returns to the operation 606. For example, the segmentation component may continue to analyze subsequent image data (e.g., frames) until no region-of-interest is identified, a no region-of-interest is identified for a threshold number of frames, or the like. In another example, the segmentation component may perform the localization/segmentation techniques for a predefined amount of image frames after the activity-detection component identifies predefined activity.

In some instances, if no further image data is to be analyzed, then at an operation 612 the segmentation component may identify which regions-of-interest correspond to one another. For example, the segmentation component may compare characteristics of a first region-of-interest to characteristics of a second region-of-interest to determine whether they correspond to one another. In another example, the segmentation component may determine an item represented by the first region-of-interest and an item represented by the second region-of-interest and may determine whether they represent the same (common item). In some instances, two (or more) regions-of-interest correspond to one another if they represent the same/common item.

At an operation 614, the system may generate trajectory data indicating a trajectory of each common item represented by two or more region(s)-of-interest that correspond to one another. In some instances, this operation comprise generating the trajectory data based on the location of these regions-of-interest that correspond to one another. For example, the system may generate trajectory data for the example common item, using at least a first location of the first region-of-interest and a second location of the second region-of-interest. That is, after determine regions-of-interest that correspond to one another, the trajectory component may generate the trajectory data based on respective locations of these regions-of-interest over time.

FIG. 6B continues the illustration of the process 600 and includes, at an operation 618, determining if an item identifier of a common item has been determined. For example, and as described above, the item-identification component 534 may analyze characteristics of the image data, weight data, and/or other sensor data to attempt to determine an item identifier corresponding to the item. This may include identifying, from image data, barcode data representing a barcode of the item. In another example, this may include using trained classifiers on feature data of the image data to identify the item.

If the item has been identified, then at an operation 620 the system may store this identification data indicating the item identifier of the common item. If not, or after storing the identification data, at an operation 622 the system may analyze the trajectory data and/or the identification data and, at an operation 624, may determine an item identifier of the common item and an action taken with respect to the common item. As described above, this may include inputting the trajectory data and/or the item-identification data into a decision classifier, configured to output an identifier of an item, an action taken with respect to the item, and confidence-level data indicating a confidence level associated with this determination. The decision classifier may comprise a support vector machine (SVM), a neural network, and/or other type of trained model/classifier.

At an operation 626, the system may store the item identifier and the action taken with respect to the common item in a virtual cart of a user. For example, upon determining that the user has taken a jar of peanuts, the system may update the virtual cart of the user to indicate the additional of the jar of peanuts. In response to determining that the user has returned a jar of peanuts, for example, the system may update the virtual cart to indicate the removal of the item.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method comprising:
analyzing a first set of multiple frames of image data to determine a first trajectory of a first item across the first set of multiple frames;
determining a first item identifier associated with the first item;
adding the first item identifier to a virtual cart based at least in part on the first trajectory;
analyzing a second set of multiple frames of image data to determine a second trajectory of a second item across the second set of multiple frames;
determining a second item identifier associated with the second item; and
storing an indication that an action associated with the second item identifier is unknown based at least in part on the second trajectory.

2. The method as recited in claim 1, wherein the first trajectory of the first item comprises a trajectory towards a receptable of a mobile cart.

3. The method as recited in claim 1, wherein the determining the first item identifier comprises determining the first item identifier based at least in part on the analyzing of the first set of multiple frames of image data.

4. The method as recited in claim 1, wherein the determining the first item identifier comprises receiving an indication of the first item identifier from a sensor coupled to a mobile cart.

5. The method as recited in claim 1, further comprising:
analyzing a third set of multiple frames of image data to determine a third trajectory of the first item across the third set of multiple frames;
determining the first item identifier associated with the first item; and
removing the first item identifier from the virtual cart based at least in part on the third trajectory.

6. The method as recited in claim 5, wherein the first trajectory of the first item comprises a trajectory away from a receptacle of a mobile cart.

7. The method as recited in claim 1, wherein the analyzing the first set of multiple frames of image data comprises analyzing the first set of multiple frames of image data generated by one or more cameras coupled to a mobile cart.

8. The method as recited in claim 1, wherein the analyzing the first set of multiple frames of image data comprises analyzing the first set of multiple frames of image data generated by one or more overhead cameras in a facility.

9. The method as recited in claim 1, further comprising:
inputting trajectory data associated with the first trajectory into a classifier; and
receiving, as output of the classifier, data indicating the first item identifier and an action taken with respect to the first item, the action indicating that the first item was placed in a receptacle of a mobile cart;
and wherein the adding comprises adding the first item identifier to the virtual cart based at least in part on the action indicating that the first item was placed in the receptacle of the mobile cart.

10. A system comprising:
one or more processors; and
one or more non-transitory computer-readable media storing computer-executable instructions that, when executed, cause the one or more processors to perform operations comprising:
analyzing a first set of multiple frames of image data to determine a first trajectory of a first item across the first set of multiple frames;
determining a first item identifier associated with the first item;
adding the first item identifier to a virtual cart based at least in part on the first trajectory;
analyzing a second set of multiple frames of image data to determine a second trajectory of a second item across the second set of multiple frames;
determining a second item identifier associated with the second item; and
storing an indication that an action associated with the second item identifier is unknown based at least in part on the second trajectory.

11. The system as recited in claim 10, wherein the first trajectory of the first item comprises a trajectory towards a receptable of a mobile cart.

12. The system as recited in claim 10, wherein the determining the first item identifier comprises determining the first item identifier based at least in part on the analyzing of the first set of multiple frames of image data.

13. The system as recited in claim 10, wherein the determining the first item identifier comprises receiving an indication of the first_item identifier from a sensor coupled to a mobile cart.

14. The system as recited in claim 10, the operations further comprising:
analyzing a third set of multiple frames of image data to determine a second third trajectory of the first item across the third set of multiple frames;
determining the first item identifier associated with the first item; and
removing the first item identifier from the virtual cart based at least in part on the third trajectory.

15. The system as recited in claim 14, wherein the first trajectory of the first item comprises a trajectory away from a receptacle of a mobile cart.

16. The system as recited in claim 10, wherein the analyzing the first set of multiple frames of image data comprises analyzing the first set multiple frames of image data generated by one or more cameras coupled to a mobile cart.

17. The system as recited in claim 10, wherein the analyzing the first set of multiple frames of image data comprises analyzing the first set of multiple frames of image data generated by one or more overhead cameras in a facility.

18. The system as recited in claim 10, operations further comprising:
inputting trajectory data associated with the first trajectory into a classifier; and
receiving, as output of the classifier, data indicating the first item identifier and an action taken with respect to the first item, the action indicating that the first item was placed in a receptacle of a mobile cart;
and wherein the adding comprises adding the first item identifier to the virtual cart based at least in part on the action indicating that the first item was placed in the receptacle of the mobile cart.

19. One or more non-transitory computer-readable media storing computer-executable instructions that, when executed, cause one or more processors to perform operations comprising:
analyzing a first set of multiple frames of image data to determine a first trajectory of a first item across the first set of multiple frames;
determining a first item identifier associated with the first item;
adding the first item identifier to a virtual cart based at least in part on the first trajectory;
analyzing a second set of multiple frames of image data to determine a second trajectory of a second item across the second set of multiple frames;
determining a second item identifier associated with the second item; and
storing an indication that an action associated with the second item identifier is unknown based at least in part on the second trajectory.

20. The one or more non-transitory computer-readable media as recited in claim 19, wherein the first trajectory of the first item comprises a trajectory towards a receptable of a mobile cart.

* * * * *